US009098130B2

(12) United States Patent
Miyachi et al.

(10) Patent No.: US 9,098,130 B2
(45) Date of Patent: Aug. 4, 2015

(54) COMPUTER-READABLE STORAGE MEDIUM HAVING STORED THEREON INPUT PROCESSING PROGRAM, INPUT PROCESSING APPARATUS, INPUT PROCESSING METHOD, AND INPUT PROCESSING SYSTEM

(75) Inventors: Kaori Miyachi, Kyoto (JP); Kensuke Tanabe, Kyoto (JP); Risa Tabata, Kyoto (JP); Yuuki Watanabe, Shibuyaku (JP)

(73) Assignee: Nintendo Co., Ltd., Kyoto (JP)

(*) Notice: Subject to any disclaimer, the term of this patent is extended or adjusted under 35 U.S.C. 154(b) by 802 days.

(21) Appl. No.: 13/210,639

(22) Filed: Aug. 16, 2011

(65) Prior Publication Data
US 2012/0306775 A1 Dec. 6, 2012

(30) Foreign Application Priority Data
Jun. 3, 2011 (JP) ................................ 2011-125506

(51) Int. Cl.
*G06F 3/041* (2006.01)
*G06F 3/0354* (2013.01)
*G06F 3/0488* (2013.01)
*A63F 13/20* (2014.01)

(52) U.S. Cl.
CPC ............ *G06F 3/03545* (2013.01); *A63F 13/06* (2013.01); *G06F 3/041* (2013.01); *G06F 3/04883* (2013.01)

(58) Field of Classification Search
CPC .................................. G06F 3/041; A63F 9/24
See application file for complete search history.

(56) References Cited

U.S. PATENT DOCUMENTS

| 2006/0052166 A1 | 3/2006 | Ohta |
| 2007/0024597 A1 | 2/2007 | Matsuoka |
| 2007/0078003 A1 | 4/2007 | Sato et al. |
| 2007/0265087 A1 | 11/2007 | Akahori et al. |

(Continued)

FOREIGN PATENT DOCUMENTS

| JP | 2004-329469 | 11/2004 |
| JP | 2007-034634 | 2/2007 |
| JP | 2007-097836 | 4/2007 |
| JP | 2007-301040 | 11/2007 |
| JP | 2009-153681 | 7/2009 |

(Continued)

OTHER PUBLICATIONS

"Touch Pen Mini Games", "Bob-omb Slingshot" under "Wario Chapter: see details" [online], May 2011, Nintendo Co., Ltd., the Internet <URL: http://www.nintendo.co.jp/ds/asmj/minigame/index.html>, with a partial English translation, 2 pages.

*Primary Examiner* — Tony N Ngo
(74) *Attorney, Agent, or Firm* — Nixon & Vanderhye, P.C.

(57) ABSTRACT

When an input indicating a position on a screen has been provided by a pointing device, coordinate values indicating the position are set as coordinate values of a starting point position. Subsequently, it is determined whether or not a state where the position on the screen is being continuously indicated by the pointing device has changed to a non-indicative state where the position on the screen is not indicated by the pointing device. As a result, when the state has changed to the non-indicative state, the coordinate values output from the pointing device before the change to the non-indicative state are set as coordinate values of an end point position, and a direction from the starting point position to the end point position is specified. Then, a virtual object is caused to move such that a moving direction of the virtual object is a direction different from the specified direction.

16 Claims, 18 Drawing Sheets

(56) References Cited

U.S. PATENT DOCUMENTS

2010/0113148 A1* 5/2010 Haltovsky et al. .............. 463/30
2011/0092289 A1* 4/2011 Dagman et al. ................. 463/37
2013/0267316 A1 10/2013 Ohta

FOREIGN PATENT DOCUMENTS

| | | |
|---|---|---|
| JP | 2009-240620 | 10/2009 |
| JP | 2010-088641 A | 4/2010 |
| JP | 2012-208637 | 10/2012 |

* cited by examiner

F I G. 2
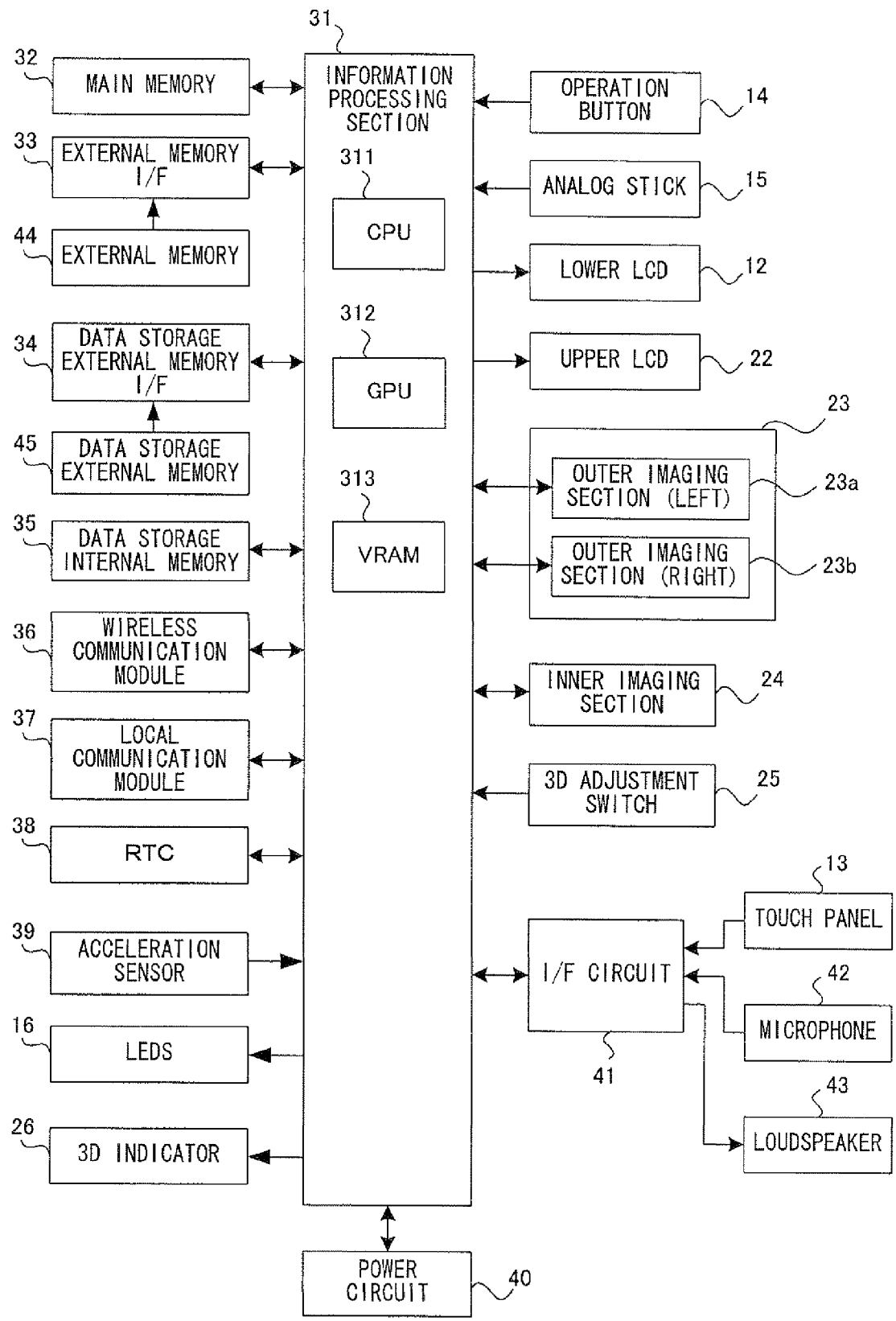

FIG. 3
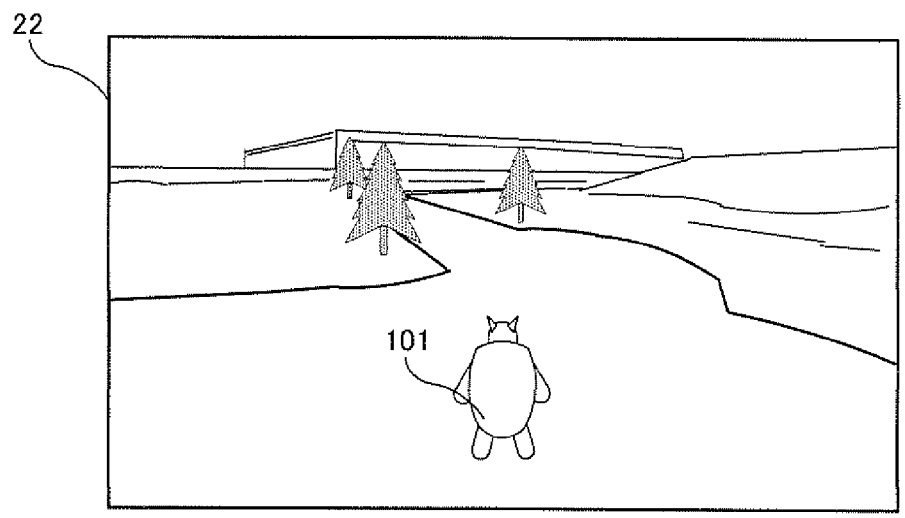
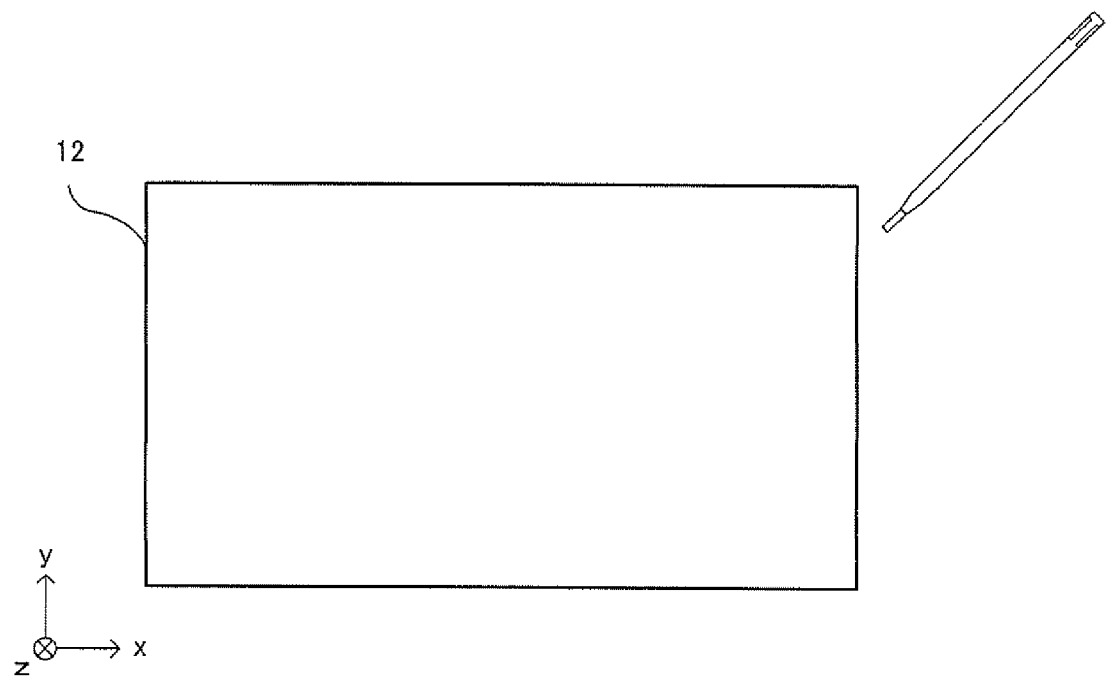

F I G. 4
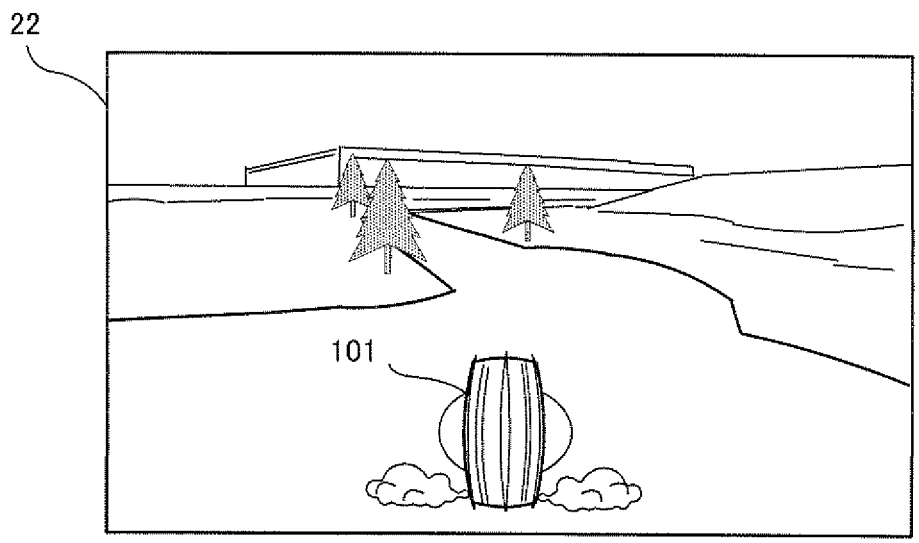
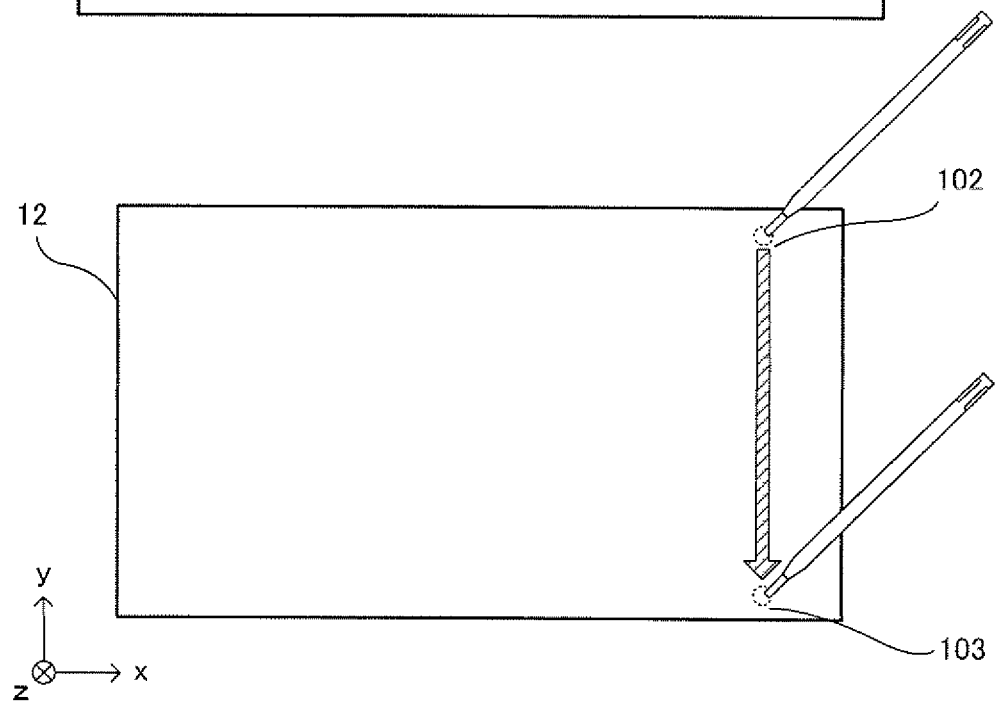

FIG. 5
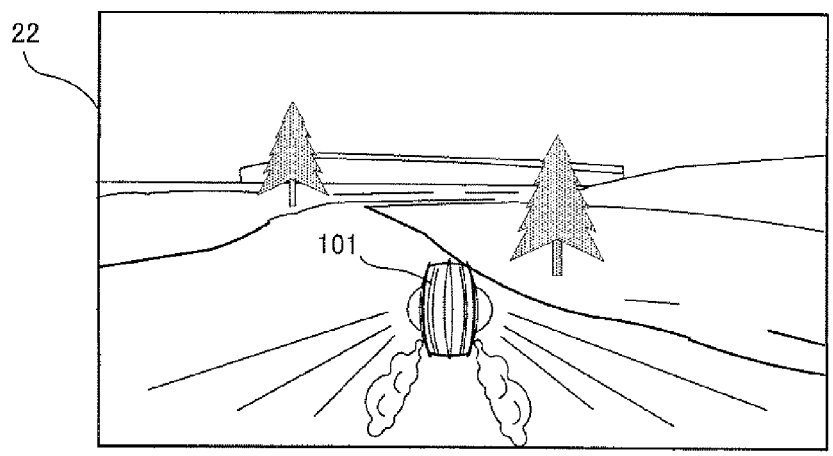
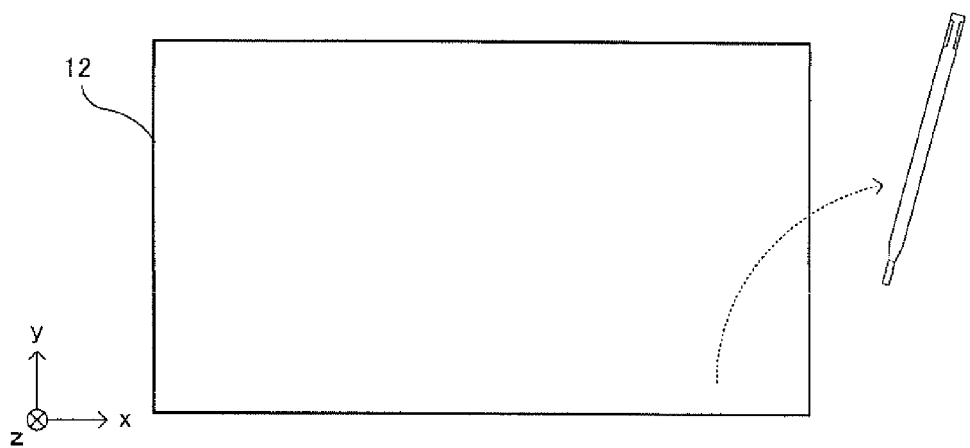
FIG. 6
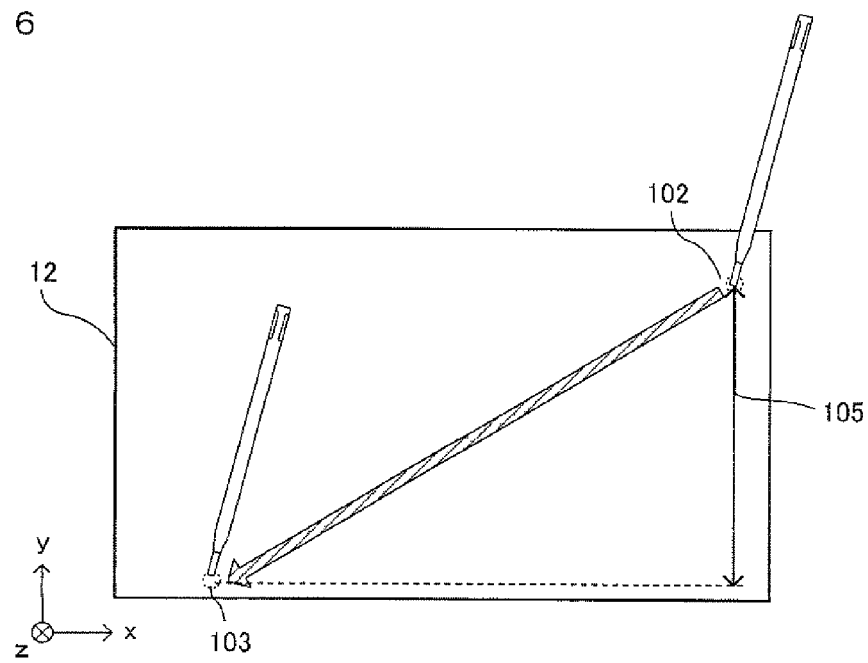

F I G. 7
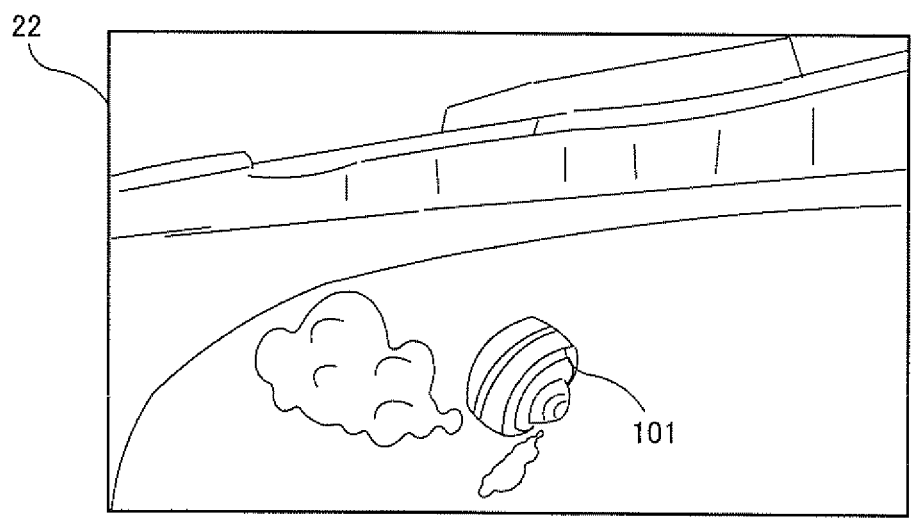
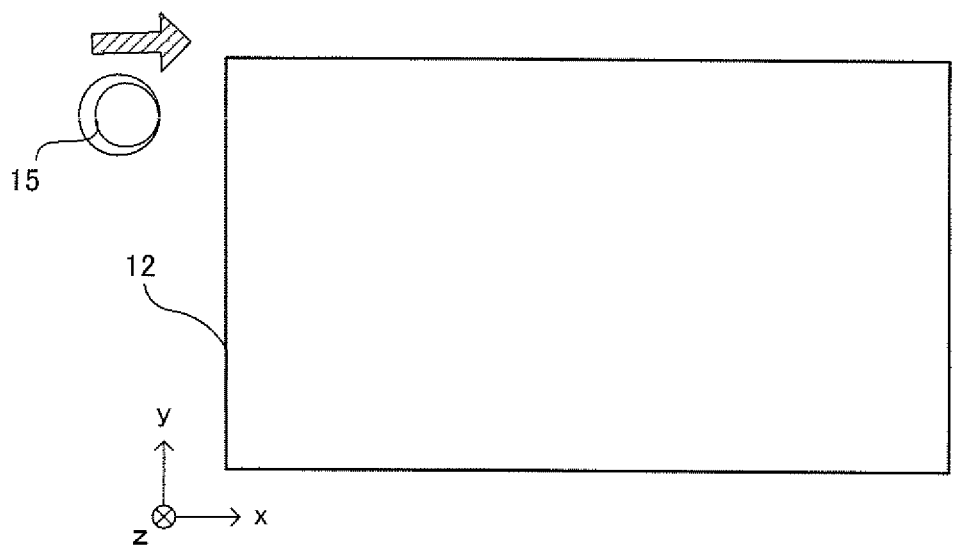

FIG. 8
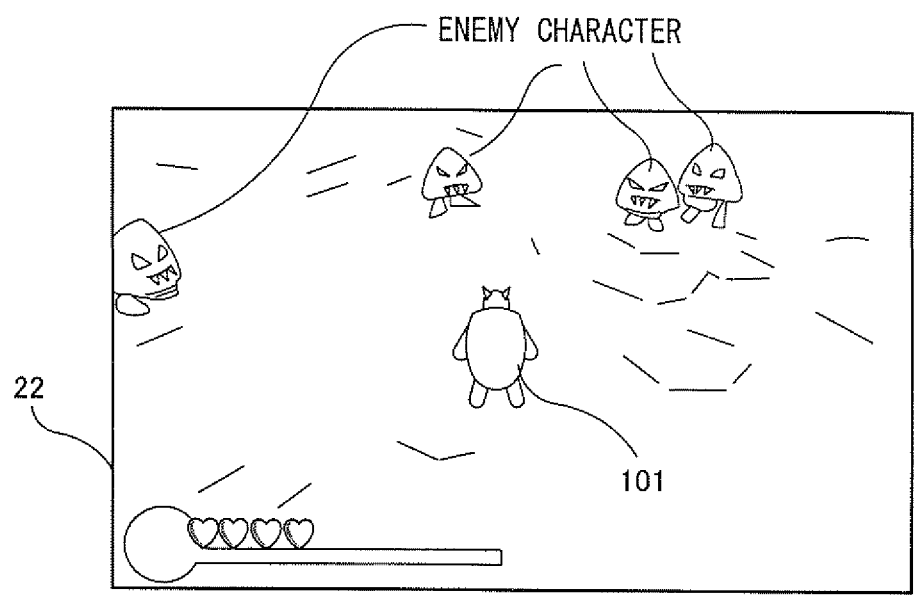
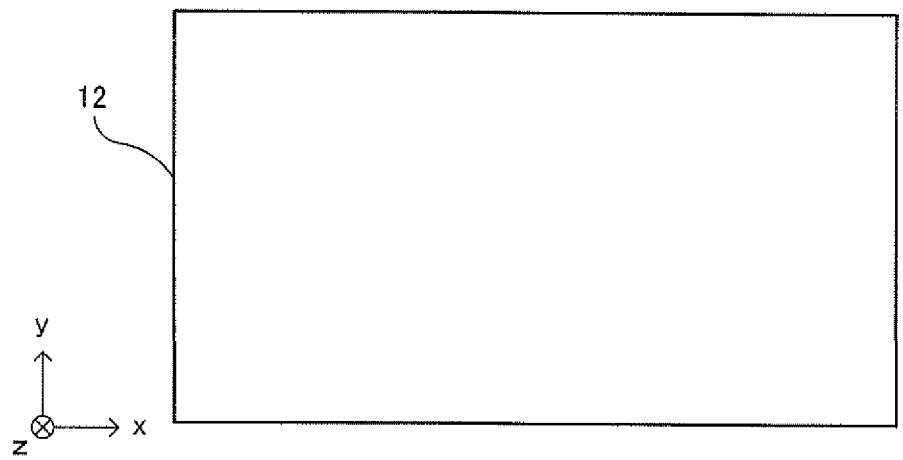

F I G. 1 2
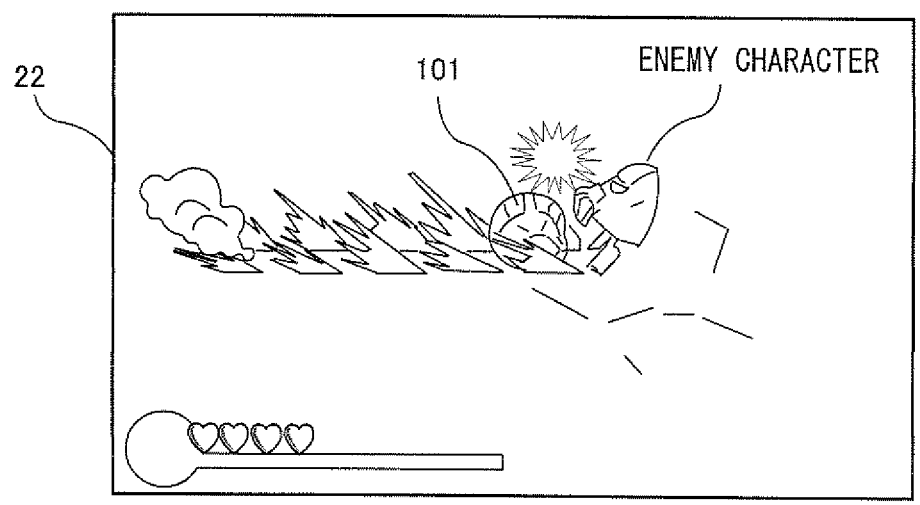
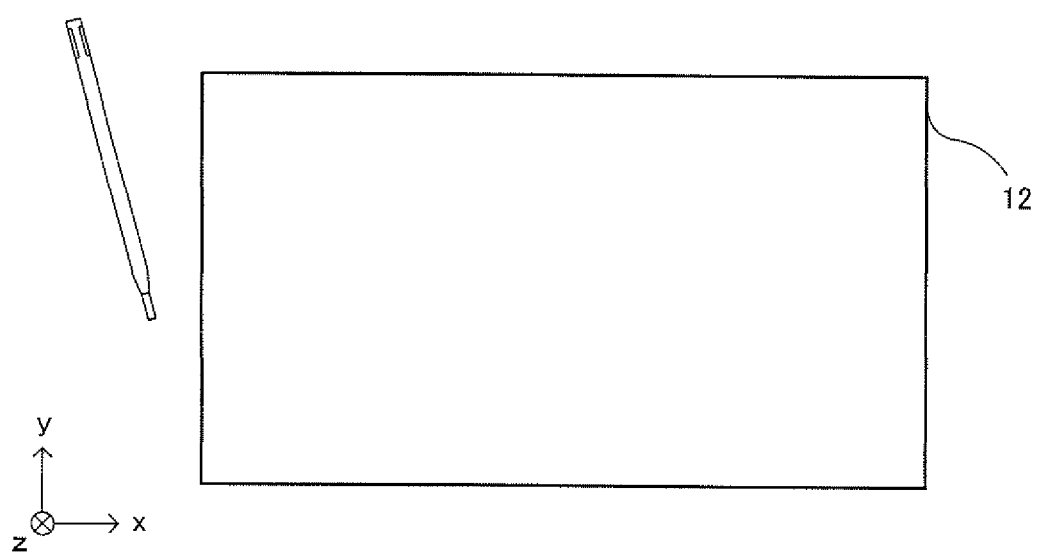

F I G. 1 3
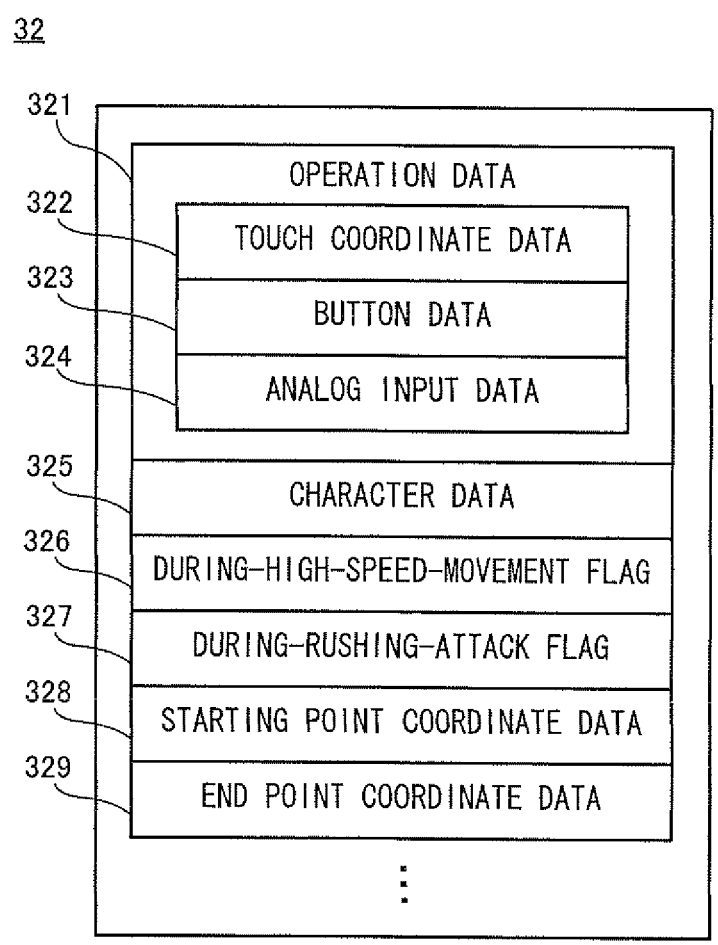

COMPUTER-READABLE STORAGE MEDIUM HAVING STORED THEREON INPUT PROCESSING PROGRAM, INPUT PROCESSING APPARATUS, INPUT PROCESSING METHOD, AND INPUT PROCESSING SYSTEM

CROSS REFERENCE TO RELATED APPLICATION

The disclosure of Japanese Patent Application No. 2011-125506, filed on Jun. 3, 2011, is incorporated herein by reference.

BACKGROUND OF THE INVENTION

1. Field of the Invention

The present invention relates to input processing using a pointing device, and in particular, relates to input processing using a pointing device for causing a virtual object to move.

2. Description of the Background Art

Conventionally, an apparatus is known that operates an object displayed on a screen, using a pointing device such as a touch panel. For example, in "Touch Pen Mini Games", "Bob-omb Slingshot" under "Wario Chapter: see details" [online], May 2011, Nintendo Co., Ltd., the Internet <URL: http://www.nintendo.co.jp/ds/asmj/minigame/index.html> (hereinafter "Non-Patent Literature 1"), an operation method is disclosed of touching a slingshot ball displayed on a screen with a touch pen or the like, and sliding the touch pen in the direction opposite to the direction in which to launch the slingshot ball, whereby it is possible to launch the slingshot ball.

In the game of Non-Patent Literature 1 described above, a slide operation is performed by directly touching the slingshot ball displayed on the screen. Thus, the position where the slide operation is started is defined in a fixed manner.

SUMMARY OF THE INVENTION

Therefore, it is a main object of the present invention to provide a computer-readable storage medium having stored thereon an input processing program capable of improving operability, and an input processing apparatus, an input processing method, and an input processing system that are capable of improving operability.

To achieve the above object, the present invention employs the following configurations.

Based on a computer-readable storage medium having stored thereon the input processing program according to the present aspect executed by a computer of an input processing apparatus having a pointing device for indicating a position on a screen, the input processing program causes the computer to function as indication input detection means, starting point position setting means, indication state determination means, end point position setting means, direction specifying means, and virtual object movement control means. The indication input detection means detects whether or not an input indicating the position on the screen has been provided by the pointing device. The starting point position setting means, when the indication input detection means has detected that the input indicating the position on the screen has been provided, sets coordinate values indicating the position on the screen that are output from the pointing device, as coordinate values of a starting point position. The indication state determination means determines whether or not, after the starting point position has been set by the starting point position setting means, a state where the input indicating the position on the screen is being continuously provided by the pointing device has changed to a non-indicative state where the input indicating the position on the screen is not provided by the pointing device. The end point position setting means, when the indication state determination means has determined that the state has changed to the non-indicative state, sets the coordinate values output from the pointing device before the change to the non-indicative state, as coordinate values of an end point position. The direction specifying means specifies a direction from the starting point position to the end point position. The virtual object movement control means causes a virtual object to move such that a moving direction of the virtual object is a direction different from the direction specified by the direction specifying means.

With the above configuration, a user can freely determine the starting position of an input for causing a virtual object to move, in a direction different from a direction of change from a starting point position to an end point position. This makes it possible to improve the operability of the virtual object.

As another configuration example, the virtual object movement control means may cause the virtual object to move when the starting point position and the end point position are different from each other in coordinate values.

With the above configuration, in an operation of indicating a position on a screen, it is possible to cause the virtual object to move when the position has changed due to a continuous indication. This makes it possible to provide an intuitive operation feeling.

As yet another configuration example, the input processing program may further cause the computer to function as during-movement input reception means for receiving a predetermined input after the movement of the virtual object caused by the virtual object movement control means has started, and the virtual object movement control means may include moving direction changing means for, when the during-movement input reception means has received the input, changing the moving direction of the virtual object in accordance with a content of the input.

With the above configuration example, even after providing an input for causing the virtual object to move in the direction different from the direction from the starting point position to the end point position, it is possible to change the moving direction of the virtual object. This makes it possible to further improve the operability of the virtual object.

As yet another configuration example, the input processing program may further cause the computer to function as switching means for switching an input mode between a first input mode and a second input mode, and when the input mode is the first input mode, the direction specifying means may specify, as the direction from the starting point position to the end point position, a direction on the basis of coordinate values of one predetermined axis defined in advance; and when the input mode is the second input mode, the direction specifying means specifies, as the direction from the starting point position to the end point position, a direction on the basis of coordinate values of at least two axes.

With the above configuration example, a plurality of input modes are provided, where the direction from the starting point position to the end point position is specified on the basis of coordinate values of different axes. This makes it possible to achieve the diversity of the operation, and therefore improve the interest of a game where the virtual object is caused to move.

As yet another configuration example, the input processing program may further cause the computer to function as during-movement input reception means for receiving a predetermined input after the movement of the virtual object caused by the virtual object movement control means has started, and the virtual object movement control means may include moving direction changing means for, if the during-movement input reception means has received the input when the input mode is the first input mode, changing the moving direction of the virtual object in accordance with a content of the input.

With the above configuration example, in an input mode where the direction from the starting point position to the end point position is specified with respect to a direction of one axis, subsequent changes in direction are received. Thus, a plurality of input modes can be provided, where the direction is changed by different techniques. This makes it possible to achieve the diversity of the operation, and therefore improve the interest of the game where the virtual object is caused to move.

If the content of the input received when the input mode is the first input mode indicates a direction of an axis different from the one predetermined axis defined in advance, the moving direction changing means may change the moving direction of the virtual object to the indicated direction of the axis.

With the above configuration example, after the movement of the virtual object has started (during the movement), it is possible to change the moving direction of the virtual object to a direction different from the direction in which the movement of the virtual object has started. This makes it possible to improve the degree of freedom of a movement operation.

As yet another configuration example, the during-movement input reception means may receive an input from input means different from the pointing device.

With the above configuration example, it is possible to change the moving direction of the virtual object that is moving, using, for example, an input device other than a pointing device (an analog stick or the like). This makes it possible to appropriately use a plurality of types of input devices, and therefore further improve the operability.

As yet another configuration example, the input processing program may further cause the computer to function as during-movement input reception means for receiving a predetermined input after the movement of the virtual object caused by the virtual object movement control means has started, and the virtual object movement control means may include stop control means for, when the during-movement input reception means has received the predetermined input, stopping the movement of the virtual object in accordance with the input.

With the above configuration example, after providing an input for causing the virtual object to move in a direction different from the direction from the starting point position to the end point position, it is possible to provide an input for stopping the virtual object. This makes it possible to improve the operability of the virtual object.

As yet another configuration example, the input processing program may further cause the computer to function as long-press determination means for determining whether or not, as the coordinate values indicating the position on the screen, the same values have been output from the pointing device continuously for a predetermined time or longer, and when the long-press determination means has determined that the same values have been output continuously for the predetermined time or longer, the stop control means may stop the movement of the virtual object.

With the above configuration example, it is possible to provide an intuitive and simple operation as an operation of stopping the virtual object, such as a long touch on a touch panel.

As yet another configuration example, the direction specifying means may specify the direction from the starting point position to the end point position on the basis of coordinate values of at least one axis, and the virtual object movement control means may set, as the moving direction of the virtual object, a direction in a virtual space corresponding to a direction opposite to the direction specified by the direction specifying means.

With the above configuration example, the virtual object moves, for example, in the direction opposite to the direction in which a slide operation has been performed on a touch panel by the user. This makes it possible to achieve an intuitive operation as an operation of causing the virtual object to move in the direction opposite to the direction of an input.

As yet another configuration example, the input processing program may further cause the computer to function as speed setting means for setting a moving speed or an acceleration of the virtual object in accordance with a distance between the starting point position and the end point position, and the virtual object movement control means may cause the virtual object to move on the basis of the moving speed or the acceleration that has been set by the speed setting means.

With the above configuration example, the moving speed of the virtual object is set in accordance with, for example, the distance of a slide operation performed on a touch panel by the user. This makes it possible to provide a comfortable and intuitive operation.

As yet another configuration example, the input processing apparatus may include a first screen and a second screen, the pointing device may be used to indicate a position on the second screen, and the virtual object may be displayed on the first screen.

With the above configuration example, it is possible to separate a screen on which the virtual object is displayed and a screen on which an operation is performed with a pointing device. This makes it possible to make the screen on which the virtual object is displayed easily viewable.

As yet another configuration example, the pointing device may be a touch panel.

With the above configuration example, it is possible to provide an intuitive and simple operation feeling.

An input processing apparatus according to the present invention is an input processing apparatus having a pointing device for indicating a position on a screen. The input processing apparatus includes indication input detection means, starting point position setting means, indication state determination means, end point position setting means, direction specifying means, and virtual object movement control means. The indication input detection means detects whether or not an input indicating the position on the screen has been provided by the pointing device. The starting point position setting means, when the indication input detection means has detected that the input indicating the position on the screen has been provided, sets coordinate values indicating the position on the screen that are output from the pointing device, as coordinate values of a starting point position. The indication state determination means determines whether or not, after the starting point position has been set by the starting point position setting means, a state where the input indicating the position on the screen is being continuously provided by the pointing device has changed to a non-indicative state where the input indicating the position on the screen is not provided by the pointing device. The end point position setting means, when the indication state determination means has determined that the state has changed to the non-indicative state, sets the coordinate values output from the pointing device before the change to the non-indicative state, as coordinate values of an end point position. The direction specifying means specifies a direction from the starting point position to the end point position. The virtual object movement control means causes a virtual object to move such that a moving direction of the virtual object is a direction different from the direction specified by the direction specifying means.

An input processing method according to the present invention is an input processing method performed by an input processing apparatus having a pointing device for indicating a position on a screen. The input processing method includes an indication input detection step, a starting point position setting step, an indication state determination step, an end point position setting step, a direction-of-change specifying step, and a virtual object movement control step. In the indication input detection step, it is detected whether or not an input indicating the position on the screen has been provided by the pointing device. In the starting point position setting step, when it is detected in the indication input detection step that the input indicating the position on the screen has been provided, coordinate values indicating the position on the screen that are output from the pointing device, are set as coordinate values of a starting point position. In the indication state determination step, it is determined whether or not, after the starting point position has been set in the starting point position setting step, a state where the input indicating the position on the screen is being continuously provided by the pointing device has changed to a non-indicative state where the input indicating the position on the screen is not provided by the pointing device. In the end point position setting step, when it is determined in the indication state determination step that the state has changed to the non-indicative state, the coordinate values output from the pointing device before the change to the non-indicative state, are set as coordinate values of an end point position. In the direction-of-change specifying step, a direction from the starting point position to the end point position is specified. In the virtual object movement control step, a virtual object is caused to move such that a moving direction of the virtual object is a direction different from the direction specified in the direction specifying step.

An input processing system according to the present invention is an input processing system having a pointing device for indicating a position on a screen. The input processing system includes indication input detection means, starting point position setting means, indication state determination means, end point position setting means, direction specifying means, and virtual object movement control means. The indication input detection means detects whether or not an input indicating the position on the screen has been provided by the pointing device. The starting point position setting means, when the indication input detection means has detected that the input indicating the position on the screen has been provided, sets coordinate values indicating the position on the screen that are output from the pointing device, as coordinate values of a starting point position. The indication state determination means determines whether or not, after the starting point position has been set by the starting point position setting means, a state where the input indicating the position on the screen is being continuously provided by the pointing device has changed to a non-indicative state where the input indicating the position on the screen is not provided by the pointing device. The end point position setting means, when the indication state determination means has determined that the state has changed to the non-indicative state, sets the coordinate values output from the pointing device before the change to the non-indicative state, as coordinate values of an end point position. The change-of-direction specifying means specifies a direction from the starting point position to the end point position. The virtual object movement control means for causing a virtual object to move such that a moving direction of the virtual object is a direction different from the direction specified by the direction specifying means.

Based on the present invention, a user can freely determine the starting position of an input for causing a virtual object to move in a direction different from a direction from a starting point position to an end point position. This makes it possible to improve the operability.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing the internal configuration of the game apparatus 10;
FIG. 3 is an example of a screen of a game assumed in the present embodiment;
FIG. 4 is an example of the screen of the game assumed in the present embodiment;
FIG. 5 is an example of the screen of the game assumed in the present embodiment;
FIG. 6 is a diagram showing an example of a slide operation;
FIG. 7 is an example of a screen of the game assumed in the present embodiment;
FIG. 8 is an example of a screen of the game assumed in the present embodiment;
FIG. 12 is an example of a screen of the game assumed in the present embodiment;
FIG. 13 is a diagram showing main data stored in a main memory 32.

DESCRIPTION OF THE PREFERRED EMBODIMENTS

With reference to the drawings, an embodiment of the present invention is described below. It should be noted that the present invention is not limited to the embodiment.

Figure 1:
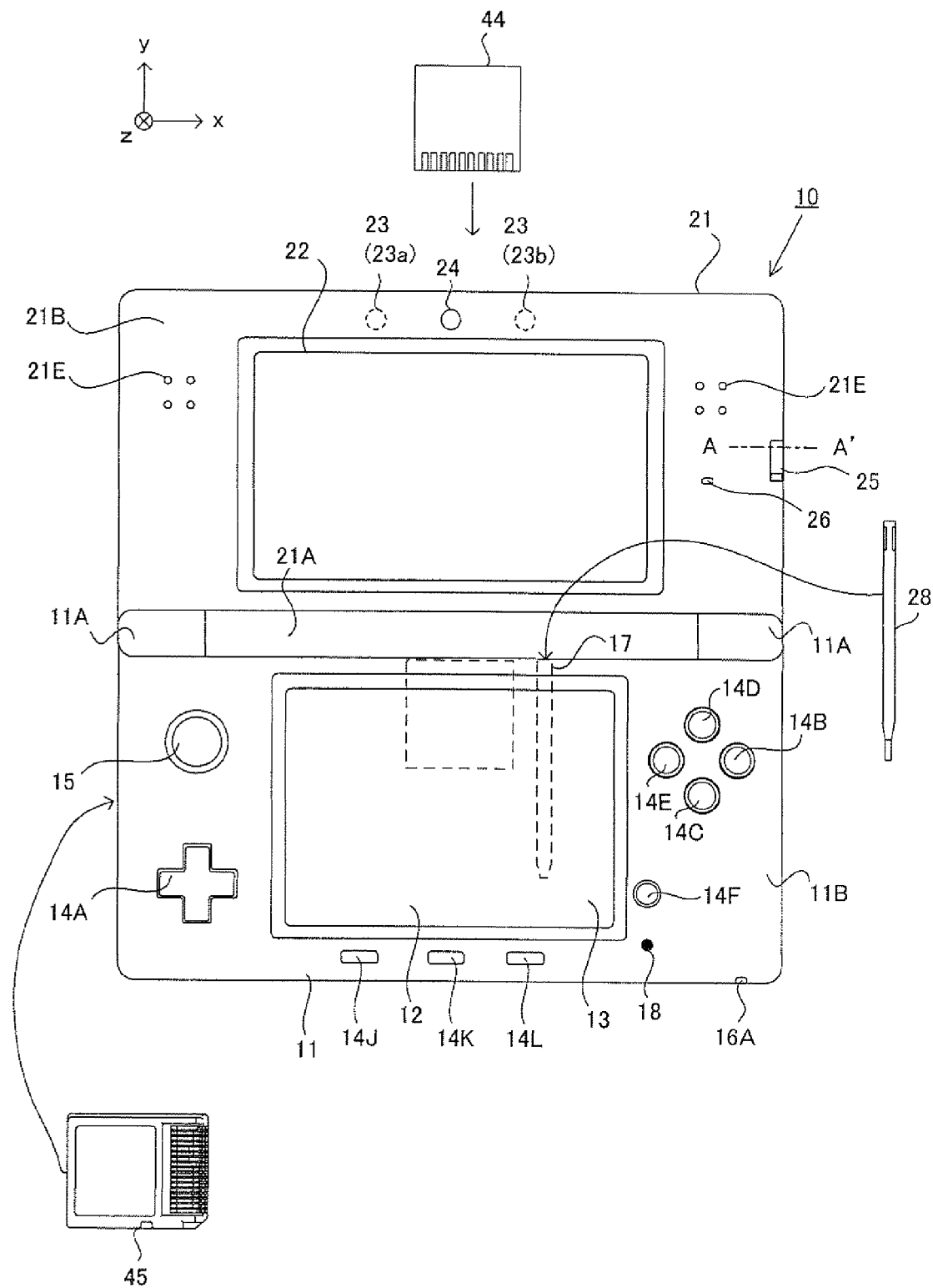
FIG. 1 is a front view of a game apparatus 10 in an open state.

Referring to FIG. 1, a game apparatus 10 is a foldable hand-held game apparatus, and is open (in an open state). The game apparatus 10 is of a size that allows a user to hold it with one hand or both hands even in the open state.

In FIGS. 1 through 3D, the game apparatus 10 includes a lower housing 11 and an upper housing 21. The lower housing 11 and the upper housing 21 are joined together so as to be openable and closable in a folding manner (foldable). In the example of FIG. 1, the lower housing 11 and the upper housing 21 each have a wider-than-high rectangular plate-like shape, and are joined together at one of the long sides of the lower housing 11 and the corresponding one of the long sides of the upper housing 21 so as to be pivotable relative to each other. Normally, a user uses the game apparatus 10 in the open state. The user stores away the game apparatus 10 in the closed state when not using it.

The lower housing 11 includes a lower liquid crystal display (LCD) 12. The lower LCD 12 has a wider-than-high shape, and is placed such that the direction along the long side of the lower LCD 12 coincides with the direction along the long side of the lower housing 11. In the present embodiment, an LCD is used as a display device included in the game apparatus 10; however, another given display device such as a display device using electroluminescence (EL) may be employed. In addition, a display device having a given resolution may be employed for the game apparatus 10.

The lower housing 11 includes operation buttons 14A through 14L and a touch panel 13 as input devices. The operation buttons 14A through 14L are each an input device for providing a predetermined input. As shown in FIG. 1, among the operation buttons 14A through 14L, the cross button 14A (direction input button 14A), the button 14B, the button 14C, the button 14D, the button 14E, the power button 14F, the select button 14J, the home button 14K, and the start button 14L are provided on the inner surface (main surface) of the lower housing 11. The cross button 14A is cross-shaped, and includes buttons for indicating up, down, left, and right directions, respectively. The button 14B, the button 14C, the button 14D, and the button 14E are arranged in a cross formation. The buttons 14A through 14E, the select button 14J, the home button 14K, and the start button 14L are appropriately assigned functions, respectively, in accordance with the program executed by the game apparatus 10. The cross button 14A is used for, for example, a selection operation. The operation buttons 14B through 14E are used for, for example, a determination operation or a cancellation operation. The power button 14F is used to power on/off the game apparatus 10.

The analog stick 15 is a device for indicating a direction, and is provided in the upper left region of the lower LCD 12 of the inner surface of the lower housing 11. It should be noted that the analog stick 15 may be a component capable of providing an analog input by being tilted by a predetermined amount in any one of up, down, right, left, and diagonal directions.

The four buttons arranged in a cross formation, namely, the button 14B, the button 14C, the button 14D, and the button 14E, are placed at the positions where the thumb of a right hand holding the lower housing 11 is naturally placed. Further, these four buttons and the analog stick 15 are placed symmetrically to each other with respect to the lower LCD 12. This also enables, for example, a left-handed person to provide a direction indication input using these four buttons, depending on the game program.

Further, the microphone hole 18 is provided on the inner surface of the lower housing 11. Underneath the microphone hole 18, a microphone is provided as the sound input device described later, and detects sound from outside the game apparatus 10.

It should be noted that the operation buttons 14I through 14K are not shown in FIG. 1. For example, the L button 14G is provided at the left end of the upper side surface of the lower housing 11. The R button 14H is provided at the right end of the upper side surface of the lower housing 11. The L button 14G and the R button 14H are used to perform, for example, a capturing instruction operation (a shutter operation) on the game apparatus 10. In addition, the volume button 14I is provided on the left side surface of the lower housing 11. The volume button 14I is used to adjust the volume of loudspeakers included in the game apparatus 10.

The game apparatus 10 further includes the touch panel 13 as an input device other than the operation buttons 14A through 14K. The touch panel 13 is mounted on the screen of the lower LCD 12. In the present embodiment, for example, a resistive touch panel is used as the touch panel 13. As the touch panel 13, however, not only a resistive touch panel but also a given pressure-type touch panel may be used. In the present embodiment, the touch panel 13 has, for example, the same resolution (detection accuracy) as that of the lower LCD 12. The resolutions of the touch panel 13 and the lower LCD 12, however, do not necessarily need to coincide with each other. Additionally, on the upper side surface of the lower housing 11, an opening 17 (a dashed line shown in FIG. 1) is provided. The opening 17 can accommodate a touch pen 28 that is used to perform an operation on the touch panel 13. Normally, an input is provided to the touch panel 13 using the touch pen 28. An input, however, can be provided to the touch panel 13 not only by the touch pen 28 but also by a finger of the user.

Further, a cover section 11C (not shown) is provided on the left side surface of the lower housing 11 so as to be openable and closable. Within the cover section 11C, a connector (not shown) is provided for electrically connecting the game apparatus 10 and a data storage external memory 45 together. The data storage external memory 45 is detachably attached to the connector. The data storage external memory 45 is used to, for example, record (store) data of an image captured by the game apparatus 10. It should be noted that the connector and the cover section 11C may be provided on the right side surface of the lower housing 11.

In addition, on the upper side surface of the lower housing 11, an insertion slot 11D (not shown) is provided, into which an external memory 44 having a game program stored thereon is to be inserted. Within the insertion slot 11D, a connector (not shown) is provided for electrically connecting the game apparatus 10 and the external memory 44 together in a detachable manner. A predetermined game program is executed by connecting the external memory 44 to the game apparatus 10. It should be noted that the connector and the insertion slot 11D may be provided on another side surface (e.g., the right side surface) of the lower housing 11.

In addition, on the lower side surface of the lower housing 11, the first LED 16A is provided for notifying the user of the on/off state of the power supply of the game apparatus 10. Further, on the right side surface of the lower housing 11, the second LED 16B is provided for notifying the user of the establishment state of the wireless communication of the game apparatus 10. Furthermore, the game apparatus 10 is capable of wirelessly communicating with other devices, and the second LED 16B is lit on when wireless communication is established. The game apparatus 10 has the function of establishing connection with a wireless LAN by, for example, a method based on the IEEE 802.11.b/g standard. On the right side surface of the lower housing 11, a wireless switch 19 (not shown) is provided for enabling/disabling the function of the wireless communication.

On the other hand, the upper housing 21 includes an upper liquid crystal display (LCD) 22, an outer imaging section 23 (an outer imaging section (left) 23a and an outer imaging section (right) 23b), an inner imaging section 24, a 3D adjustment switch 25, and a 3D indicator 26. The upper LCD 22 has a wider-than-high shape, and is placed such that the long side direction of the upper LCD 22 coincides with the long side direction of the upper housing 21. It should be noted that as in the lower LCD 12, a display device using another given method and having a given resolution may be employed instead of the upper LCD 22. It should be noted that a touch panel may be provided so as to cover the upper LCD 22.

In addition, the upper LCD 22 is placed at the center of the upper housing 21. The area of the screen of the upper LCD 22 is set greater than that of the lower LCD 12. Further, the screen of the upper LCD 22 is set horizontally longer than the screen of the lower LCD 12.

The screen of the upper LCD 22 is provided on the inner surface (main surface) 21B of the upper housing 21, and is exposed through an opening provided in the upper housing 21. For example, the number of pixels of the upper LCD 22 may be 640 dots×200 dots (horizontal×vertical). It should be noted that an LCD is used as the upper LCD 22 in the present embodiment; however, a display device using electroluminecence (EL) or the like may be employed. Furthermore, a display device having a given resolution may be used as the upper LCD 22.

The upper LCD 22 is a display device capable of displaying a stereoscopically visible image. Further, the upper LCD 22 is a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the present embodiment, the upper LCD 22 is of a parallax barrier type. Furthermore, the upper LCD 22 is capable of disabling the parallax barrier. When disabling the parallax barrier, the upper LCD 22 is capable of displaying an image in a planar manner. Thus, the upper LCD 22 is a display device capable of switching between: the stereoscopic display mode for displaying a stereoscopically visible image; and the planar display mode for displaying an image in a planar manner (displaying a planar view image). The switching of the display modes is performed by the 3D adjustment switch 25 described later, which is a slide switch.

The "outer imaging section 23" is the collective term of the two imaging sections (23a and 23b) provided on an outer surface (the back surface, which is the opposite side to the main surface including the upper LCD 22) 21D of the upper housing 21. The outer imaging section (left) 23a and the outer imaging section (right) 23b are placed symmetrically to each other with respect to the center of the upper LCD 22 (the upper housing 21) in the left-right direction.

The inner imaging section 24 is provided on the inner surface (main surface) 21B of the upper housing 21, and functions as an imaging section having an imaging direction that is the same as the inward normal direction of the inner surface 21B of the upper housing 21. The inner imaging section 24 includes an imaging device (e.g., a CCD image sensor or a CMOS image sensor) having a predetermined resolution, and a lens. The lens may have a zoom mechanism.

The 3D indicator 26 indicates whether or not the upper LCD 22 is in the stereoscopic display mode. The 3D indicator 26 is an LED, and is lit on when the stereoscopic display mode of the upper LCD 22 is enabled.

In addition, speaker holes 21E are provided on the inner surface of the upper housing 21. Sound from the loudspeaker 43 described later is output through the speaker holes 21E.

(Internal Configuration of Game Apparatus 10)

Next, with reference to FIG. 2, a description is given of the internal electrical configuration of the game apparatus 10. FIG. 2 is a block diagram showing the internal configuration of the game apparatus 10. As shown in FIG. 2, the game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, a power circuit 40, and an interface circuit (I/F circuit) 41. These electronic components are mounted on electronic circuit boards, and are accommodated in the lower housing 11 (or may be accommodated in the upper housing 21).

The information processing section 31 is information processing means including a central processing unit (CPU) 311 that executes a predetermined program, a graphics processing unit (GPU) 312 that performs image processing, and the like. The CPU 311 of the information processing section 31 executes a program stored in a memory (e.g., the external memory 45 connected to the external memory I/F 33, or the data storage internal memory 35) included in the game apparatus 10, and thereby performs processing corresponding to the program. It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are connected. The external memory I/F 33 is an interface for establishing a detachable connection with the external memory 44. The data storage external memory I/F 34 is an interface for establishing a detachable connection with the data storage external memory 45.

The main memory 32 is volatile storage means used as a work area or a buffer area of (the CPU 311 of) the information processing section 31. That is, the main memory 32 temporarily stores various types of data used for the processing on the basis of the program, and also temporarily stores a program acquired from outside (the external memory 44, another device, or the like) the game apparatus 10. In the present embodiment, the main memory 32 is, for example, a pseudo SRAM (PSRAM).

The external memory 44 is nonvolatile storage means for storing the program executed by the information processing section 31. The data storage external memory 45 is composed of a readable/writable nonvolatile memory (e.g., a NAND flash memory), and is used to store predetermined data.

The data storage internal memory 35 is composed of a readable/writable nonvolatile memory (e.g., a NAND flash memory), and is used to store predetermined data.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., communication using a unique protocol or infrared communication). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

In addition, the acceleration sensor 39 is connected to the information processing section 31. The acceleration sensor 39 detects the magnitudes of the accelerations in the directions of straight lines (linear accelerations) along three axial (x, y, and z axes) directions, respectively. The acceleration sensor 39 is provided within the lower housing 11.

In addition, The RTC 38 and the power circuit 40 are connected to the information processing section 31. The RTC 38 counts time, and outputs the counted time to the information processing section 31. The information processing section 31 calculates the current time (date) on the basis of the time counted by the RTC 38. The power circuit 40 controls the power from the power supply (the rechargeable battery accommodated in the lower housing 11, which is described above) of the game apparatus 10, and supplies power to each component of the game apparatus 10.

In addition, the I/F circuit 41 is connected to the information processing section 31. A microphone 42 and a loudspeaker 43 are connected to the I/F circuit 41. Specifically, the loudspeaker 43 is connected to the I/F circuit 41 through an amplifier not shown in the figures. The microphone 42 detects sound from the user, and outputs a sound signal to the I/F circuit 41. The amplifier amplifies the sound signal from the I/F circuit 41, and outputs sound from the loudspeaker 43. Further, the touch panel 13 is connected to the I/F circuit 41. The I/F circuit 41 includes: a sound control circuit that controls the microphone 42 and the loudspeaker 43 (amplifier); and a touch panel control circuit that controls the touch panel 13. For example, the sound control circuit performs A/D conversion and D/A conversion on the sound signal, and converts the sound signal into sound data in a predetermined format. The touch panel control circuit generates touch position data in a predetermined format on the basis of a signal from the touch panel 13, and outputs the touch position data to the information processing section 31. The touch position data indicates the coordinates of the position at which an input has been provided on the input surface of the touch panel 13. It should be noted that the touch panel control circuit reads a signal from the touch panel 13, and generates the touch position data, once in a predetermined time. The information processing section 31 acquires the touch position data, and thereby recognizes the position at which the input has been provided to the touch panel 13.

An operation button 14 includes the operation buttons 14A through 14L described above, and is connected to the information processing section 31. Operation data is output from the operation button 14 to the information processing section 31, the operation data indicating the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes a stereoscopic image (stereoscopically visible image) to be displayed on the upper LCD 22.

The outer imaging section 23 and the inner imaging section 24 are connected to the information processing section 31. The outer imaging section 23 and the inner imaging section 24 each capture an image in accordance with an instruction from the information processing section 31, and output data of the captured image to the information processing section 31.

The 3D adjustment switch 25 is connected to the information processing section 31. The 3D adjustment switch 25 transmits an electrical signal corresponding to the position of the slider 25a to the information processing section 31.

In addition, The 3D indicator 26 is connected to the information processing section 31. The information processing section 31 controls whether or not the 3D indicator 26 is to be lit on. When, for example, the upper LCD 22 is in the stereoscopic display mode, the information processing section 31 lights on the 3D indicator 26.

Next, with reference to FIGS. 3 through 12, a description is given of an overview of a game assumed in the present embodiment. The game assumed in the present embodiment is an action game set in a virtual three-dimensional space. FIG. 3 is an example of a screen of the game assumed in the present embodiment. In FIG. 3, a player character 101 as viewed from the back is displayed. Further, the player character is a character representing an armadillo. Processing described in the present embodiment mainly concerns the operation of causing the player character 101 to move. To cause the player character 101 to move in the game, basically, a player operates the analog stick 15 so that the player character 101 moves in accordance with the direction that has been input. The moving direction at this time allows the player character 101 to move in any direction through 360°. It should be noted that here, it is assumed that a virtual camera is placed at a position a predetermined distance away from the player character 101. Accordingly, for example, when, on the screen of FIG. 3, the player has provided an input to the analog stick 15 downward, the player character 101 turns around 180° such that its front can be viewed, and the screen is displayed as if the player character 101 moves to the near side as viewed from the player. That is, in the game, in principle, the virtual camera is not controlled to always follow the back of the player character.

In addition to the movement operation as described above, in the present embodiment, an operation using the touch panel 13 makes it possible to cause the player character 101 to move at a high speed in the traveling direction thereof. The operation concerning the high-speed movement is described below.

When the player has performed a touch-on operation on a given position in the touch panel 13 with the touch pen 28 when the player character 101 is in the state as shown in FIG. 3 (hereinafter referred to as a "normal state"), the player character 101 curls into a tire-like shape, and starts to rotate on the spot in the traveling direction. FIG. 4 is a diagram showing the player character 101 that is rotating in such a manner. In FIG. 4, a point 102 shows the position on which the touch-on operation has been performed. Subsequently, the touch pen 28 is slid downward while remaining in contact with the touch panel 13. In the example of FIG. 4, the touch pen 28 is slid to the position of a point 103 (hereinafter, such an operation is occasionally referred to as a "slide operation"). Then, when the player has separated the touch pen 28 from the touch panel 13 at the position of the point 103 (performed a touch-off operation), as shown in FIG. 5, the player character 101 in the curled state moves at a high speed (like a tire rolls) in the traveling direction thereof (in the forward direction in the game space). Further, after the player character 101 has started to move at a high speed as described above, the moving speed of the player character 101 gradually decreases. Then, ultimately, the movement stops, and the player character 101 returns to the normal state as shown in FIG. 3. It is also possible to apply a brake on the player character 101 by continuing to touch a predetermined point in the touch panel 13 for a predetermined time or longer while the player character 101 is moving at a high speed. It should be noted that in the following descriptions, the state of the player character 101 that is moving at a high speed is referred to as a "high-speed movement state".

That is, it is possible to cause the player character 101 to move at a high speed in the traveling direction thereof by the operation of: performing a touch-on operation on a given position in the touch panel 13 with the touch pen 28 or the like; performing a slide operation downward while maintaining the touch pen 28 or the like in contact with the touch panel 13; and performing a touch-off operation. Further, at this time, the moving speed of the player character 101 moving at a high speed changes in accordance with the magnitude of the distance between the position on which the touch-on operation has been performed and the position on which the touch-off operation has been performed. In other words, the moving speed is determined in accordance with this distance. In the present embodiment, the greater the distance, the faster the moving speed. Here, the distance is a straight-line distance only with respect to one axial, namely Y-axis, direction. Accordingly, not only when the touch pen 28 has been slid vertically downward as shown in FIG. 4, but also when the touch pen has been moved from the upper right to the lower left as shown in FIG. 6, the moving speed of the player character 101 is determined on the basis of a distance 105 only with respect to the Y-axis direction between the point 102, which is the touch-on position, and the point 103, which is the touch-off position.

In addition, in the game, it is also possible to change the direction of the player character 101 that is moving at a high speed, by operating the analog stick 15. For example, when the player has provided an input to the analog stick 15 rightward while the player character 101 is moving at a high speed, it is possible, as shown in FIG. 7, to change the traveling direction of the player character 101 to a right direction in the game space. That is, it is also possible to perform an operation like the steering operation of a vehicle. Further, it is also possible to reaccelerate the player character 101 as a result of the player performing a slide operation as described above while the player character 101 is moving at a high speed.

In addition, the game employs a battle system using a so-called symbol encounter system. That is, when the player character 101 has made contact with a predetermined enemy character as a result of the player causing the player character 101 to move by performing operations as described above, screens switch, and a transition is made to the mode termed a "battle mode". Here, for ease of description, as opposed to the battle mode, the states of FIGS. 3 through 7 described above are hereinafter referred to as a "field mode".

FIG. 8 is an example of a screen of the battle mode. In the battle mode, a battle field having a predetermined area is set, and the player character 101 fights against at least one enemy character. In the battle mode, it is possible to attack the enemy character by causing the player character 101 to charge at the enemy character.

The operations performed in the battle mode are described below. Basically, it is possible to cause the player character 101 to move by operating the analog stick 15. The moving direction at this time allows the player character 101 to move in any direction through 360°.

Figure 9:
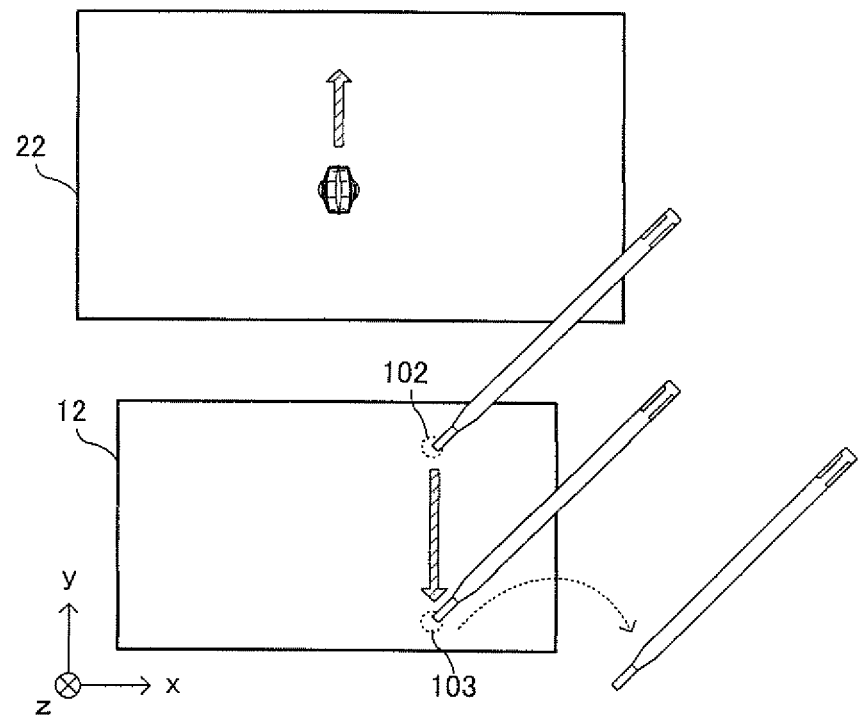
FIG. 9 is a diagram showing an example of a slide operation.
Figure 10:
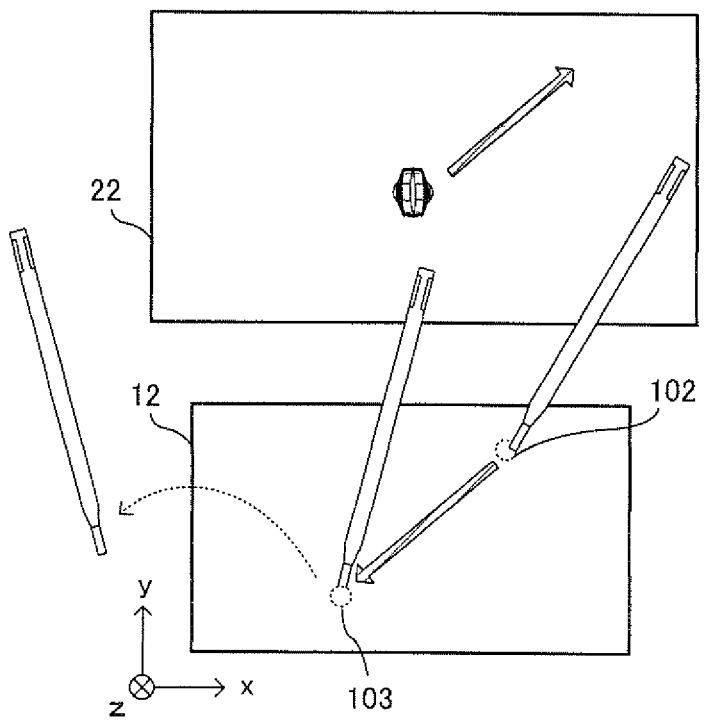
FIG. 10 is a diagram showing an example of a slide operation.
Figure 11:
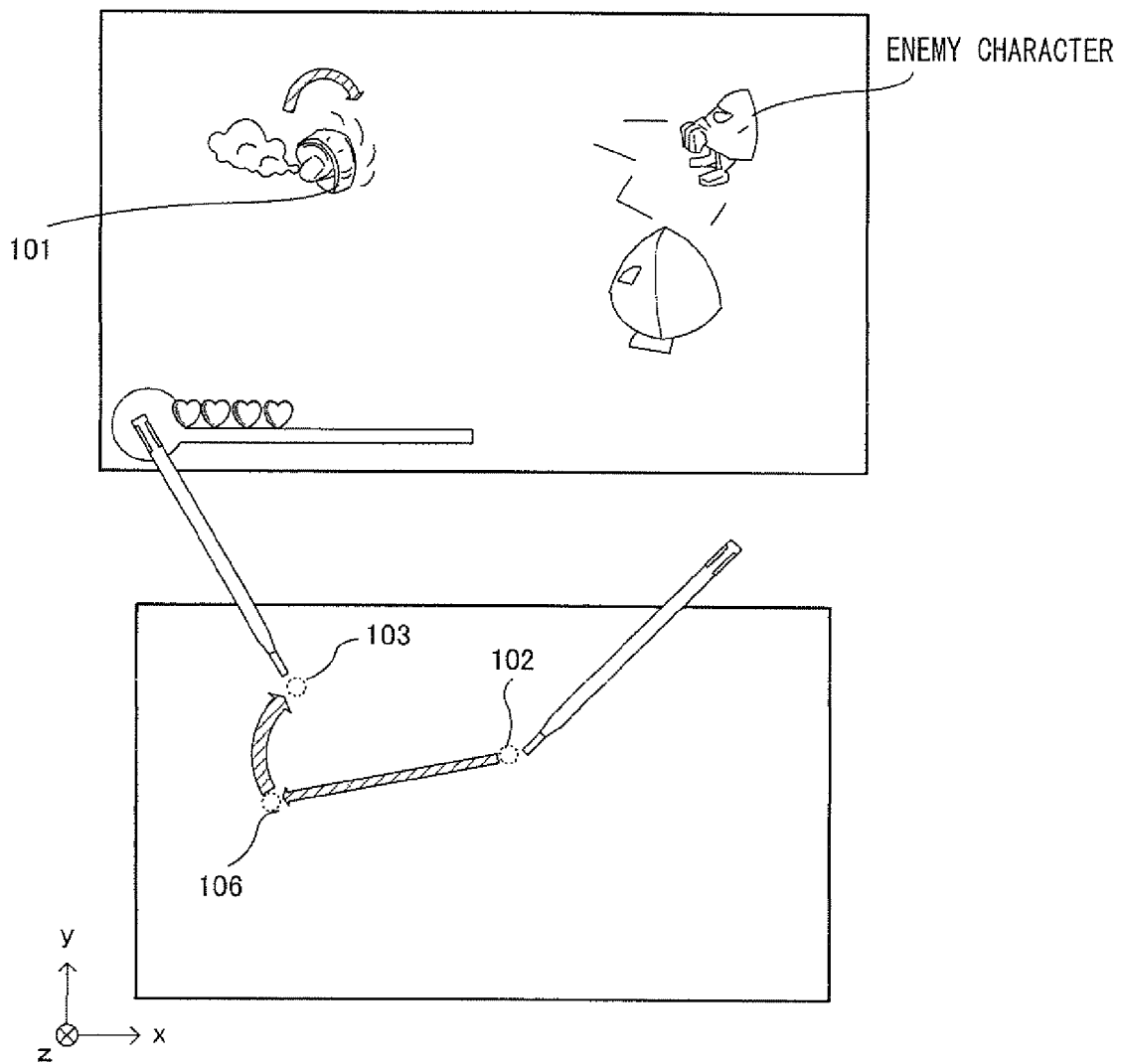
FIG. 11 is an example of a screen of the game assumed in the present embodiment.

Next, a description is given of the operation of causing the player character 101 to charge in order to attack the enemy character. Basically, it is possible to perform this operation by performing a slide operation on the touch panel 13 as described above. That is, when the player has performed a touch-on operation on a given position in the touch panel 13 in the state of FIG. 8, the player character 101 curls on the spot. Then, when the player has performed a slide operation, the player character 101 starts to rotate at a high speed. Then, when the player has performed a touch-off operation after the slide operation, the player character 101 makes a rushing movement. Unlike in the field mode, however, in the battle mode, the rushing direction is set such that the player character 101 rushes in (the direction in the virtual game space corresponding to) the direction opposite to the direction in which the slide operation has been performed. That is, in the field mode, a high-speed movement is made using only Y-axis coordinates in a slide operation, whereas, in the battle mode, a rushing movement is made using both X-axis and Y-axis coordinates in a slide operation. In the game according to the present embodiment, in such a slide operation, the Y-axis direction of the touch panel 13 corresponds to a Z-axis direction in the virtual game space. Accordingly, for example, when, as shown in FIG. 9, the player has performed a slide operation on the touch panel 13 vertically downward and then performed a touch-off operation, the player character 101 rushes in the forward direction in the virtual game space (a Z-axis positive direction) (seems to rush vertically upward in the game screen). Further, when, as shown in FIG. 10, the player has performed a slide operation downward to the left and then performed a touch-off operation, the player character 101 rushes diagonally forward to the right in the game space (seems to rush upward to the right in the game screen). Furthermore, during a slide operation, the direction of the player character 101 is also changed in real time in accordance with the positional relationship between the position on which the touch-on operation has been performed and the current touch position. For example, it is assumed that, as shown in FIG. 11, the player has performed a touch-on operation on the point 102 with the touch pen 28, has subsequently performed a slide operation once to the position of a point 106 at the lower left (but has not yet performed a touch-off operation here), and has subsequently performed a slide operation to the position of the point 103 at the upper right. The direction of the player character 101 is also changed on the spot in accordance with this operation. Consequently, in the example of FIG. 11, the player character 101 is directed slightly upward to the right (the direction opposite to the straight-line direction from the point 102 to the point 106) during the slide operation from the point 102 to the point 106. Then, the player character 101 gradually becomes directed downward to the right from the above state (the direction opposite to the straight-line direction from the point 102 to the point 103) in accordance with the slide operation to the point 103.

As described above, the determination of the rushing direction of the player character 101 using a slide operation and the performance of a touch-off operation cause the player character to, as shown in FIG. 12, rush rolling at a high speed along the rushing direction (it is assumed that in FIG. 12, the rushing direction has ultimately been determined as a right direction). Then, if an enemy character is present on the path, the player character charges at, that is, makes an attack on, the enemy character. Such an attack in the battle mode is hereinafter referred to as a "rushing attack". Further, when the player character 101 that had made an attack, or the player character 101 that had rushed, has reached an end of the battle field, or when the player character 101 has rushed a certain distance even without reaching an end of the battle field, the rushing state ends. Thus, the player character 101 returns from the curled state to the original state.

As described above, in the processing according to the present embodiment, the player performs a touch-on operation on a given position in the touch panel, performs a slide operation, and subsequently performs a touch-off operation. This makes it possible to cause the player character 101 to move at a high speed (rush, in the battle mode). That is, the player can freely determine the position serving as the starting point of the slide operation as described above. This makes it possible to improve the operability of the operation of causing the player character 101 to move.

Next, a description is given of various data necessary for performing the game processing according to the present embodiment. The data is stored in the external memory 44 or the data storage internal memory 35, and is transferred to and stored in the main memory 32 when the game program is executed.

FIG. 13 is a diagram showing main data stored in the main memory 32. Referring to FIG. 13, the main memory 32 stores operation data 321, character data 325, during-high-speed-movement flag 326, during-rushing-attack flag 327, starting point coordinate data 328, end point coordinate data 329, and the like.

The operation data 321 indicates the content of the operation performed on the game apparatus 10 by the player. The operation data 321 includes: touch coordinate data 322 indicating touch coordinates detected on the touch panel 13; operation button data 323 indicating the states of the pressing of various buttons of the operation button 14; and analog input data 324 indicating the state of the input of the analog stick 15. It should be noted that in the present embodiment, it is assumed that the operation data 321 is updated every 1/200 seconds.

The character data 325 is data of the player character 101 and various enemy characters that appear in the game. For example, the character data 325 includes modeling data.

The during-high-speed-movement flag 326 is a flag indicating whether or not the player character 101 is moving at a high speed in the field mode.

The during-rushing-attack flag 327 is a flag indicating whether or not the player character 101 is rushing in the battle mode (i.e., moving at a high speed in the battle mode).

The starting point coordinate data 328 indicates the starting point of the touch position in a series of a touch panel operation (the slide operation described above) concerning the operation for the high-speed movement or the operation for the rushing. Further, similarly, the end point coordinate data 329 indicates the end point (the latest touch position at that time).

In addition, the main memory 32 appropriately stores various data necessary in the game processing.

Next, with reference to FIGS. 14 through 19, a description is given of details of the game processing performed by the game apparatus 10. It should be noted that in the present embodiment, a description is given mainly of the processing concerning the operation of causing the player character 101 to move at a high speed as described above, and therefore, the game processing performed in other situations are not described in detail.

Figure 14:
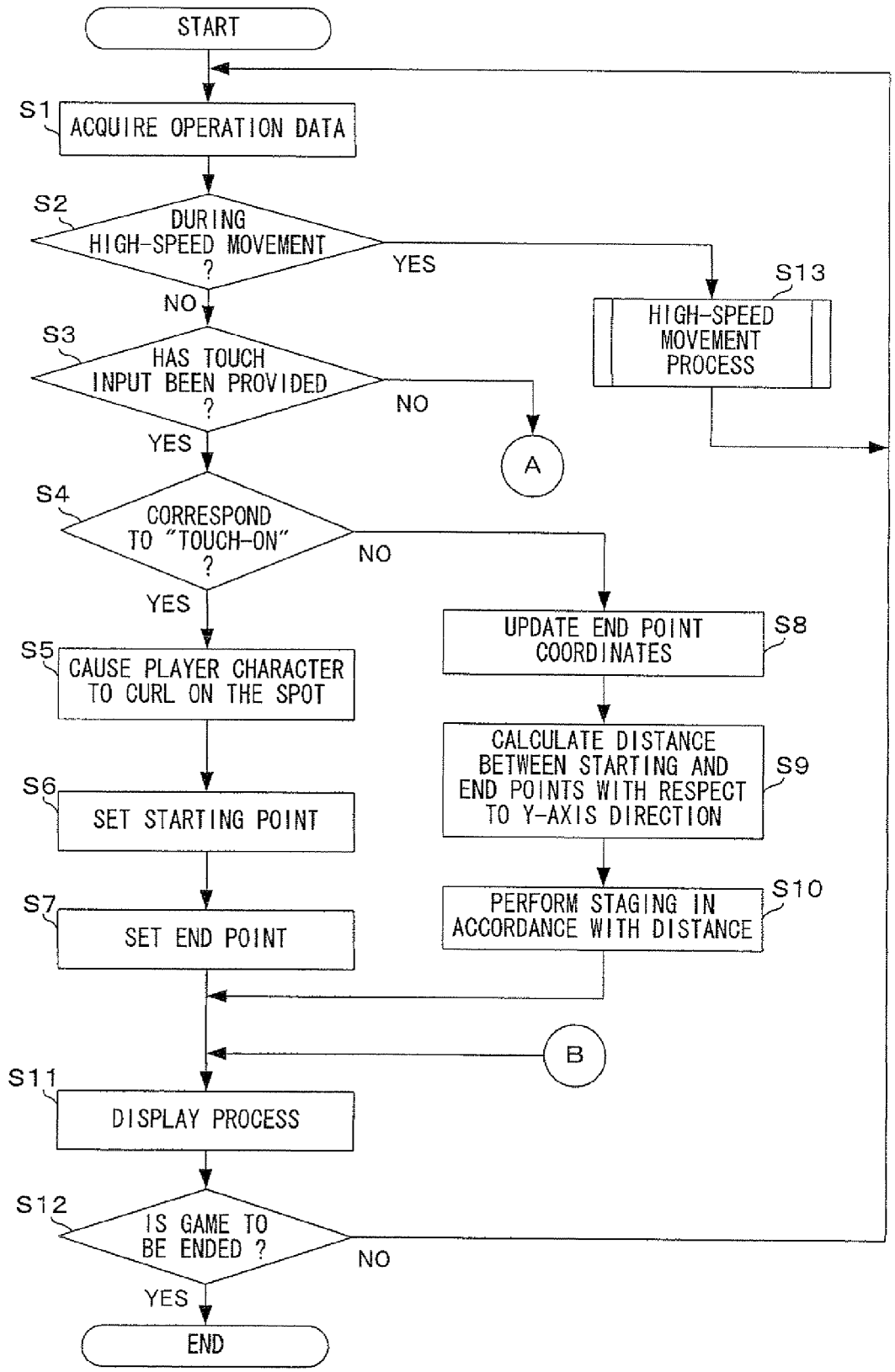
FIG. 14 is a flow chart showing the flow of game processing performed by the game apparatus 10.
Figure 15:
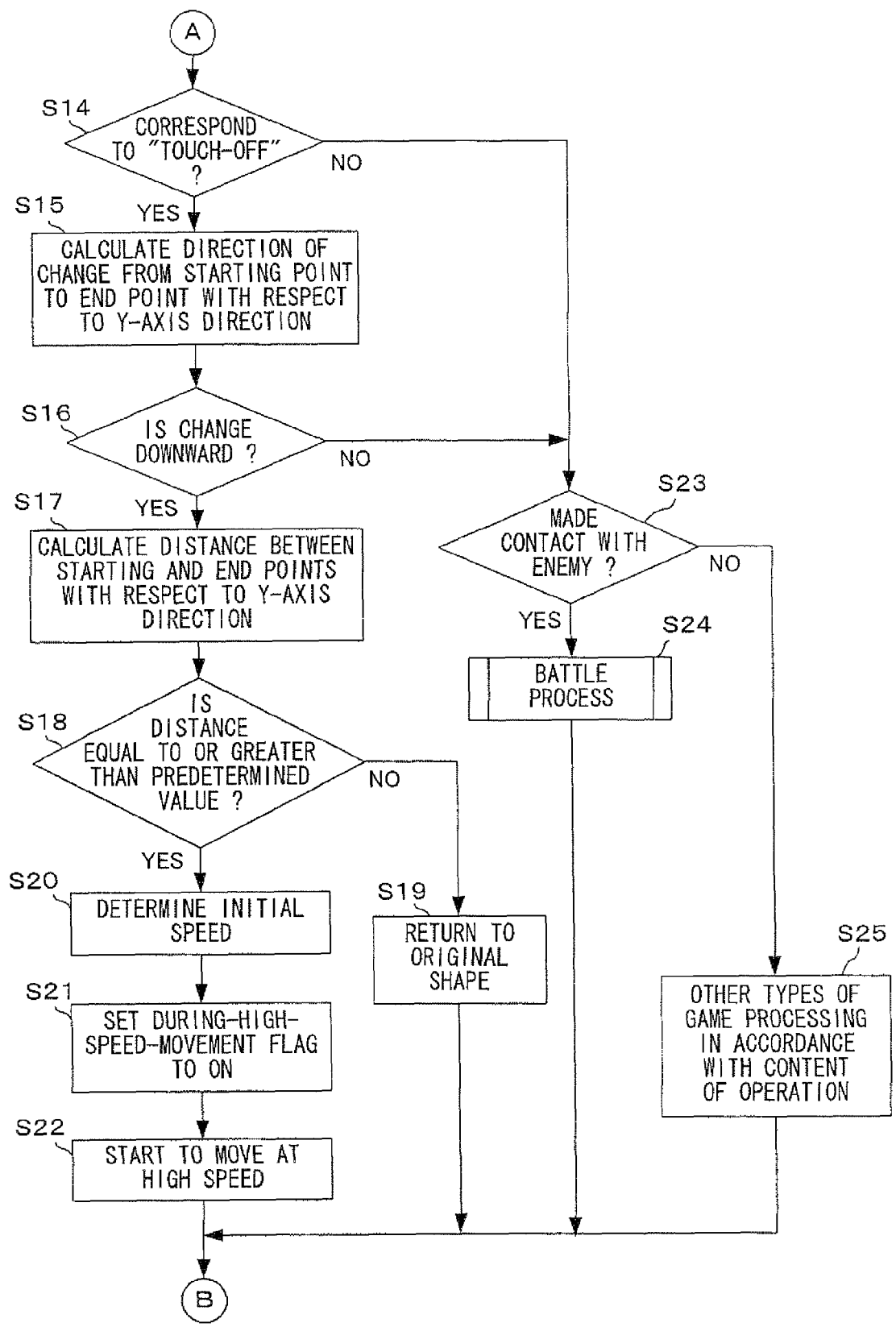
FIG. 15 is a flow chart showing the flow of the game processing performed by the game apparatus 10.

FIGS. 14 and 15 are flow charts showing the flow of the game processing performed by the game apparatus 10. It should be noted that the loop of the processes of steps S1 through S25 that is shown in FIGS. 14 and 15 is performed in each frame in a repeated manner (except for the case where step S24 or S13 is performed).

First, in step S1, the operation data 321 is acquired. Subsequently, in step S2, it is determined with reference to the during-high-speed-movement flag 326 whether or not the player character 101 is in a high-speed movement state. As a result, when it is determined that the player character 101 is in a high-speed movement state (YES in step S2), the processing proceeds to a high-speed movement process in step S13 described later.

On the other hand, when it is determined that the player character 101 is not in a high-speed movement state (NO in step S2), subsequently, in step S3, it is determined on the basis of the operation data 321 whether or not an input has been provided to the touch panel 13 (whether or not the player is touching the touch panel). As a result, when it is determined that an input has not been provided to the touch panel 13 (NO in step S3), the processing proceeds to step S14 described later.

On the other hand, when it is determined that an input has been provided to the touch panel 13 (YES in step S3), subsequently, in step S4, it is determined whether or not the content of the operation corresponds to "touch-on". Here, "touch-on" means the operation of the player touching the touch panel 13. That is, it is determined whether or not an input to the touch panel 13 has been detected in the processing of the current frame after an input has not been provided to the touch panel 13 in the processing of the previous frame. The determination may be made by, for example, appropriately storing, in the main memory 32, data indicating the presence or absence of a touch in the previous frame, and using the stored data. As a result of the determination, when it is determined that the content of the operation corresponds to "touch-on" (YES in step S4), in the subsequent step S5, the player character 101 is changed to the curled state as shown in FIG. 4 described above. In the subsequent step S6, with reference to the touch coordinate data 322, the content of the touch coordinate data 322 (coordinate data indicating the current touch position) is set as the starting point coordinate data 328. Further, in step S7, similarly, the touch coordinate data 322 is set as the end point coordinate data 329. Subsequently, the processing proceeds to step S11 described later.

On the other hand, as a result of the determination in step S4, when it is determined that the content of the operation does not correspond to "touch-on" (NO in step S4), it is considered that the player is continuing to provide an input to (continuing to touch) the touch panel 13. In this case, in step S8, with reference to the touch coordinate data 322, the end point coordinate data 329 is updated using the content of the touch coordinate data 322. Subsequently, in step S9, with reference to the starting point coordinate data 328 and the end point coordinate data 329, the straight-line distance only with respect to the Y-axis direction between the starting point and the end point is calculated. Further, in step S10, staging is performed in accordance with the calculated distance. For example, staging is performed such that the longer the distance, the faster the speed of causing the player character 101 to rotate on the spot. Then, the processing proceeds to step S11 described below.

Next, in step S11, a process is performed of generating a game image on which the content of the previous processing is reflected, and displaying the game image on the upper LCD 22. In the subsequent step S12, it is determined whether or not game ending conditions have been satisfied. When the game ending conditions have not been satisfied (NO in step S12), the processing returns to step S1, and the same processing is repeated. When the game ending conditions have been satisfied (YES in step S12), the game processing ends.

Next, a description is given of a process performed when, as a result of the determination in step S3, it is determined that an input has not been provided to the touch panel 13 (NO in step S3). In this case, in step S14 of FIG. 15, it is determined whether or not the content of the operation corresponds to "touch-off". Here, "touch-off" means the operation of the player ceasing to touch (separating the touch pen 28 or the like from) the touch panel 13. That is, it is determined whether or not an input to the touch panel 13 has yet to be detected in the processing of the current frame after an input has been provided to the touch panel 13 in the processing of the previous frame. As a result of the determination, when it is determined that the content of the operation corresponds to "touch-off" (YES in step S14), subsequently, in step S15, with reference to the starting point coordinate data 328 and the end point coordinate data 329, the direction of change from the starting point to the end point with respect to the Y-axis direction (the Y-axis component of the direction in which a slide operation has been performed) is calculated. Subsequently, in step S16, it is determined whether or not the direction of change is downward. That is, it is determined whether the sliding direction of the slide operation is upward or downward. Further, here, only a change with respect to the Y-axis direction in the touch panel coordinate system is observed. Accordingly, for example, if the slide operation is performed diagonally downward, the slide operation is calculated as a downward change. As a result of the determination, when it is determined that the direction of change is not downward (NO in step S16), the processing proceeds to step S23 described later.

On the other hand, when it is determined that the direction of change is downward (YES in step S16), subsequently, in step S17, with reference to the starting point coordinate data 328 and the end point coordinate data 329, the straight-line distance only with respect to the Y-axis direction between the starting point and the end point is calculated (here, a distance in the coordinate system of the touch panel 13). Subsequently, in step S18, it is determined whether or not the distance is equal to or greater than a predetermined value. That is, it is determined whether or not a somewhat large slide operation has been performed. As a result, when it is determined that the distance is not equal to or greater than the predetermined value (NO in step S18), in step S19, the shape of the player character 101 is returned to the original shape (returned to the state before curling). Subsequently, the processing proceeds to step S11.

On the other hand, when it is determined that the distance is equal to or greater than the predetermined value (YES in step S18), a process of starting a high-speed movement is performed. First, in step S20, the initial speed of the moving speed of the player character 101 is determined on the basis of the calculated distance. Here, it is assumed that the longer the calculated distance, the greater the value of the initial speed is set to be. Subsequently, in step S21, the during-high-speed-movement flag 326 is set to on. Then, in step S22, the player character 101 starts to move at a high speed on the basis of the determined initial speed. Subsequently, the processing proceeds to step S11 described above.

On the other hand, as a result of the determination in step S14, when it is determined that the content of the operation does not correspond to "touch-off" (NO in step S14), or, as a result of the determination in step S16, when it is determined that the direction of change is not downward (NO in step S16), in step S23, it is determined whether or not the player character 101 has made contact with a predetermined enemy character present in a game field. That is, an encounter determination of the symbol encounter system is made. As a result, when it is determined that the player character 101 has made contact with the enemy character (YES in step S23), in step S24, a battle process is performed, which is a process concerning the battle mode. Details of the process will be described later. On the other hand, when it is determined that the player character 101 has not contact with the enemy character (NO in step S23), in step S25, other types of game processing on the basis of the content of the operation and the like are appropriately performed. Then, the processing proceeds to step S11 described above.

Figure 16:
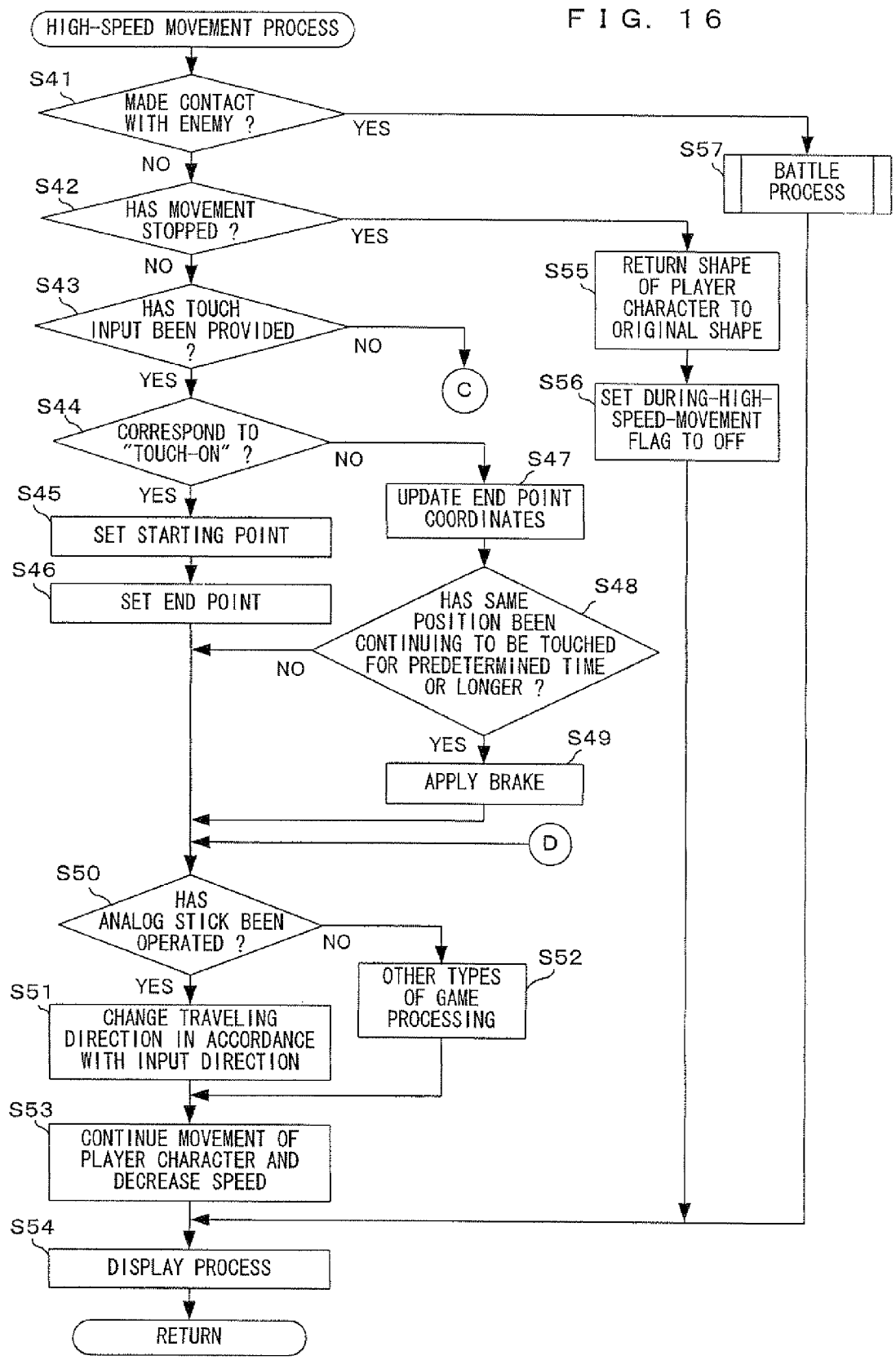
FIG. 16 is a flow chart showing details of a high-speed movement process in step S13 of FIG. 14.
Figure 17:
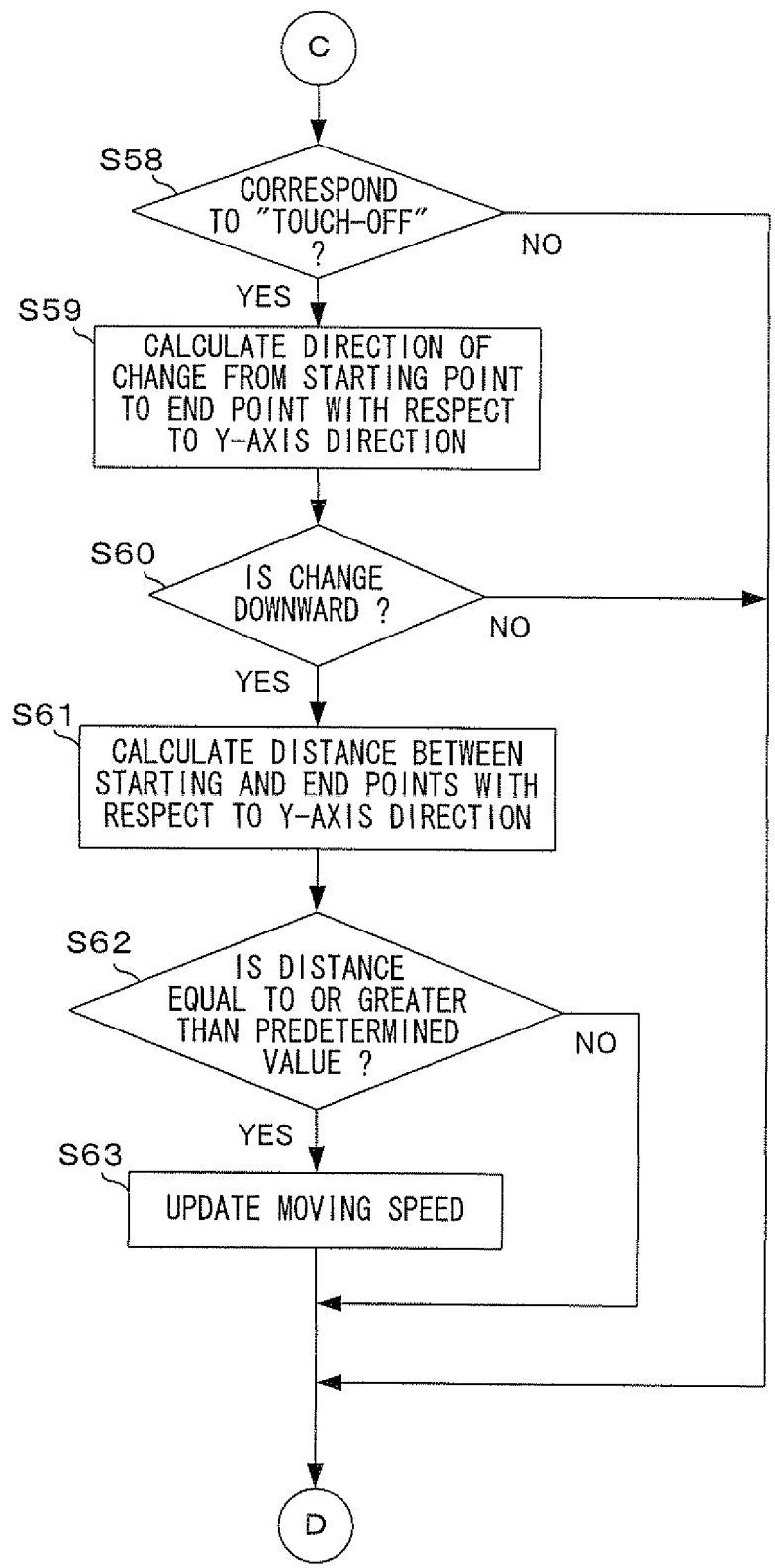
FIG. 17 is a flow chart showing the details of the high-speed movement process in step S13 of FIG. 14.

Next, a description is given of a process performed when, as a result of the determination in step S2 of FIG. 14, it is determined that the player character 101 is in a high-speed movement state (YES in step S2). In this case, in step S13, the high-speed movement process is performed. FIGS. 16 and 17 are flow charts showing details of the high-speed movement process. First, in step S41, it is determined whether or not the player character 101 has made contact with a predetermined enemy character (i.e., an encounter determination made during the high-speed movement). As a result, when it is determined that the player character 101 has made contact with the enemy character (YES in step S41), the processing proceeds to a battle process in step S57. Details of the process will be described later.

On the other hand, when it is determined that the player character 101 has not made contact with the enemy character (NO in step S41), subsequently, in step S42, it is determined whether or not the movement of the player character 101 has stopped. As a result, when it is determined that the movement has stopped (YES in step S42), in step S55, a process is performed of changing the shape of the player character 101 from the curled state as described above to the original state. In the subsequent step S56, the during-high-speed-movement flag 326 is set to off. Then, the processing proceeds to step S54 described later.

On the other hand, as a result of the determination in step S42, when it is determined that the movement has not yet stopped (NO in step S42), in the subsequent step S43, it is determined with reference to the operation data 321 whether or not an input to the touch panel 13 has been detected. As a result, when it is determined that an input has not been provided to the touch panel 13 (NO in step S43), the processing proceeds to step S58 described later.

On the other hand, when it is determined that an input has been provided to the touch panel (YES in step S43), in the subsequent step S44, it is determined whether or not the content of the operation corresponds to "touch-on". As a result, when it is determined that the content of the operation corresponds to "touch-on" (YES in step S44), a process concerning a slide operation performed during the high-speed movement is performed. First, in step S45, with reference to the touch coordinate data 322, the content of the touch coordinate data 322 is set as the starting point coordinate data 328. Further, in step S46, similarly, the touch coordinate data 322 is set as the end point coordinate data 329. Subsequently, the processing proceeds to step S50 described later.

On the other hand, as a result of the determination in step S44, when it is determined that the content of the operation does not correspond to "touch-on" (NO in step S44), in step S47, with reference to the touch coordinate data 322, the end point coordinate data 329 is updated using the content of the touch coordinate data 322. Subsequently, in step S48, it is determined whether or not the same touch position has been continuing to be touched for a predetermined time or longer (whether or not the touch panel 13 has been long pressed). As a result, when the same touch position has been continuing to be touched for the predetermined time or longer (YES in step S48), in step S49, a process is performed of applying a brake on the player character 101 that is moving at a high speed. Here, it is assumed that the process of applying a brake is performed by increasing the rate of decrease of the moving speed. Subsequently, the processing proceeds to step S50 described later. On the other hand, when the same touch position has not been continuing to be touched for the predetermined time or longer (NO in step S48), it is considered that, for example, a slide operation is being performed. In this case, the process of step S49 is skipped, and the processing proceeds to step S50 described later.

Next, in step S50, it is determined whether or not the analog stick 15 has been operated. That is, it is determined whether or not the operation of changing directions has been performed during the high-speed movement. As a result, when it is determined that the analog stick 15 has been operated (YES in step S50), in step S51, with reference to the analog input data 324, a process is performed of appropriately changing the traveling direction of the player character 101 on the basis of the content of the analog input data 324. Subsequently, the processing proceeds to step S53 described later. On the other hand, when it is determined that the analog stick 15 has not been operated (NO in step S50), in step S52, various other types of game processing are appropriately performed. Subsequently, the processing proceeds to step S53 described later.

Next, in step S53, the process concerning the high-speed movement of the player character 101 is continued. That is, a process is performed of causing the player character 101 to move, and also of decreasing the moving speed at a predetermined rate. It should be noted that when the process of applying a brake has been performed in step S49, the rate of decrease of the speed set in the process (which is a greater rate of decrease) is applied to the predetermined rate.

Next, in step S54, a process is performed of generating a game image on which the content of the previous processing is reflected, and displaying the game image on the upper LCD 22. Then, the high-speed movement process ends.

Next, a description is given of a process performed when, as a result of the determination in step S43, it is determined that an input has not been provided to the touch panel 13 (NO in step S43). In this case, in step S58 of FIG. 17, it is determined whether or not the content of the operation corresponds to "touch-off". As a result of the determination, when it is determined that the content of the operation does not correspond to "touch-off" (NO in step S58), the processing proceeds to step S50. On the other hand, when it is determined that the content of the operation corresponds to "touch-off" (YES in step S58), subsequently, in step S59, with reference to the starting point coordinate data 328 and the end point coordinate data 329, the direction of change from the starting point to the end point with respect to the Y-axis direction is calculated. Subsequently, in step S60, it is determined whether or not the direction of change is downward. As a result of the determination, it is determined that the direction of change is not downward (NO in step S60), the processing proceeds to step S50.

On the other hand, when it is determined that the direction of change is downward (YES in step S60), a process is performed of updating the moving speed of the high-speed movement. First, in step S61, with reference to the starting point coordinate data 328 and the end point coordinate data 329, the straight-line distance only with respect to the Y-axis direction between the starting point and the end point is calculated. Subsequently, in step S62, it is determined whether or not the distance is equal to or greater than a predetermined value. As a result, when it is determined that the distance is equal to or greater than the predetermined value (YES in step S62), subsequently, in step S63, the moving speed of the player character 101 is updated on the basis of the calculated distance. Here, the update of the moving speed may be performed by a process of, for example, resetting the current moving speed to the speed that has been set as the initial speed at the start of the high-speed movement. Alternatively, the update of the moving speed may be performed by calculating an acceleration in accordance with the distance, and applying the acceleration to the current moving speed. Subsequently, the processing proceeds to step S53 described above. Consequently, a process is performed of causing the player character to move on the basis of the moving speed after the update. That is, the further performance of a slide operation as described above during the high-speed movement makes it possible to update (reaccelerate) the moving speed of the high-speed movement, and continue the high-speed movement state.

On the other hand, as a result of the determination in step S62, when it is determined that the distance is not equal to or greater than the predetermined value (NO in step S62), the process of step S63 is skipped. That is, if a somewhat large slide operation has not been performed, the speed is not to be updated. Subsequently, the processing proceeds to step S50 described above.

This is the end of the description of the high-speed movement process.

Figure 18:
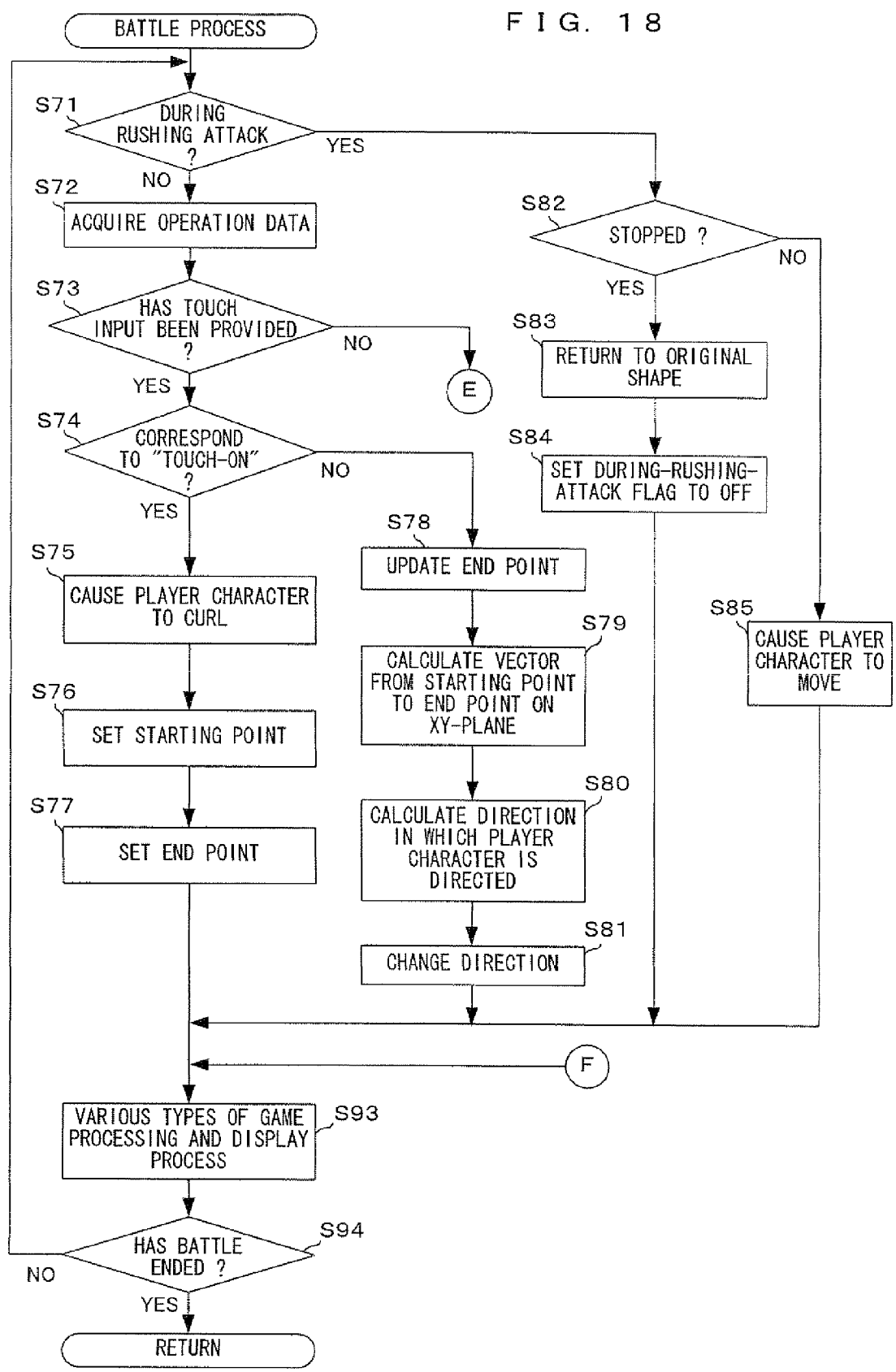
FIG. 18 is a flow chart showing details of a battle process shown in step S24 of FIG. 15 or step S53 of FIG. 16.
Figure 19:
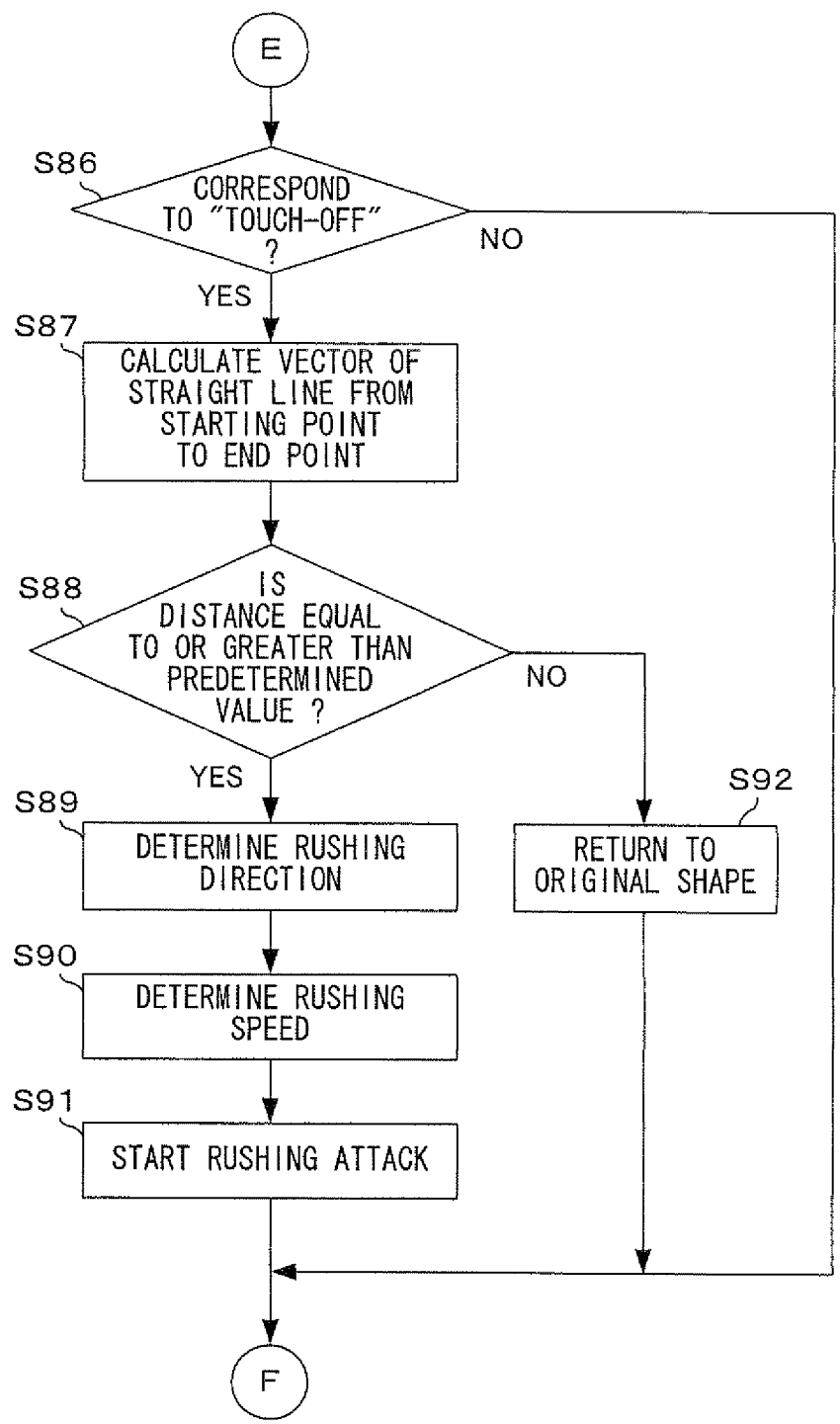
FIG. 19 is a flow chart showing the details of the battle process shown in step S24 of FIG. 15 or step S53 of FIG. 16.

Next, a description is given of details of the battle process in step S24 or S57. FIG. 18 is a flow chart showing the details of the battle process shown in step S24 or S57. First, in step S71, it is determined with reference to the during-rushing-attack flag 327 whether or not the player character 101 is making a rushing attack. As a result, when it is determined that the player character 101 is not making a rushing attack (NO in step S71), in step S72, the operation data 321 is acquired. Subsequently, in step S73, it is determined on the basis of the operation data 321 whether or not an input has been provided to the touch panel 13. As a result, when it is determined that an input has not been provided to the touch panel 13 (NO in step S73), the processing proceeds to step S86 described later.

On the other hand, when it is determined that an input has been provided to the touch panel 13 (YES in step S73), subsequently, in step S74, it is determined whether or not the content of the operation corresponds to "touch-on". As a result, when it is determined that the content of the operation corresponds to "touch-on" (YES in step S74), in step S75, the player character 101 is changed to the curled state. Subsequently, in step S76, with reference to the touch coordinate data 322, the content of the touch coordinate data 322 is set as the starting point coordinate data 328. Further, in step S77, similarly, the touch coordinate data 322 is set as the end point coordinate data 329. Subsequently, the processing proceeds to step S93 described later.

On the other hand, as a result of the determination in step S74, when it is determined that the content of the operation does not correspond to "touch-on" (NO in step S74), a process is performed of changing the direction of the player character 101 during a slide operation as described above. First, in step S78, with reference to the touch coordinate data 322, the end point coordinate data 329 is updated using the content of the touch coordinate data 322. Subsequently, in step S79, with reference to the starting point coordinate data 328 and the end point coordinate data 329, the vector of the straight line connecting the starting point (touch-on position) to the current touch position on the XY-plane (of the touch panel coordinate system), and the direction of the vector are calculated.

Next, in step S80, the direction in which the player character 101 is directed (the rushing direction) is calculated on the basis of the direction of the vector. For example, the direction opposite to that of the direction of the vector is calculated. Then, the opposite direction in the touch panel coordinate system is transformed into that in the coordinate system of the virtual game space (the coordinates on the XY-plane of the touch panel 13 are transformed into the coordinates on the XZ-plane of the virtual game space). Thus, the direction of the player character 101 in the virtual game space is calculated. Then, in step S81, the direction of the player character 101 is changed on the basis of the calculated direction. Subsequently, the processing proceeds to step S93 described later.

It should be noted that the technique of calculating the direction (rushing direction) of the player character 101 is not limited to the technique using the vector as described above. Alternatively, the angle between the starting point and the current touch position may be calculated on the basis of the starting point coordinate data 328 and the end point coordinate data 329, and the direction of the player character 101 may be calculated on the basis of the angle. For example, a circle having the starting point as its central point may be assumed; the angle between the starting point and the current touch position may be calculated by placing the current touch position in the circle; and the direction of the player character 101 may be changed on the basis of the angle.

Next, a description is given of a process performed when, as a result of the determination in step S73, it is determined that an input has not been provided to the touch panel 13 (NO in step S73). In this case, in step S86 of FIG. 19, it is determined whether or not the content of the operation corresponds to "touch-off". As a result, when it is determined that the content of the operation does not correspond to "touch-off" (NO in step S86), the processing proceeds to step S93 described later. On the other hand, when it is determined that the content of the operation corresponds to "touch-off" (YES in step S86), subsequently, in step S87, the vector of the straight line connecting the starting point to the end point (the touch coordinates obtained when the touch-off operation has been performed) is calculated on the basis of the starting point coordinate data 328 and the end point coordinate data 329.

In the subsequent step S88, it is determined whether or not the magnitude of the vector, that is, the straight-line distance between the starting point and the end point, is equal to or greater than a predetermined value. As a result, when the magnitude of the vector is not equal to or greater than the predetermined value (NO in step S88), in step S92, the player character 101 is returned to the original shape. Then, the processing proceeds to step S93 described later. That is, if a somewhat large slide operation has not been performed, a rushing attack is not to be made.

On the other hand, as a result of the determination in step S88, when it is determined that the distance is equal to or greater than the predetermined value (YES in step S88), a process of starting a rushing attack is performed. First, in step S89, the rushing direction is determined on the basis of the calculated vector. In this case, as described above, the direction opposite to that of the vector is calculated, and the direction obtained by transforming the opposite direction into that in the coordinate system of the virtual game space is determined as the rushing direction. Further, unlike in the field mode where the direction only with respect to the Y-axis is used, the rushing direction is calculated as a direction containing both X-axis and Y-axis components.

Next, in step S90, the initial speed of the rushing attack is determined on the basis of the calculated magnitude of the vector (the straight-line distance between the starting point and the end point). In the subsequent step S91, the rushing attack on the basis of the rushing direction and the initial speed that have been determined is started. Then, the processing proceeds to step S93 described later.

Next, a description is given of a process performed when, in step S71 of FIG. 18, it is determined that the player character 101 is making a rushing attack (YES in step S71). In this case, in step S82, it is determined whether or not the movement of the player character 101 concerning the rushing attack has stopped. As a result, when it is determined that the movement has stopped (YES in step S82), in step S83, the shape of the player character 101 is returned to the original shape. Further, in step S84, the during-rushing-attack flag 327 is set to off. Then, the processing proceeds to step S93 described later. On the other hand, when it is determined that the movement has not yet stopped (NO in step S82), the movement of the player character 101 concerning the rushing attack is continued. Then, the processing proceeds to step S93.

Next, in step S93, various other types of game processing (e.g., a hitting determination process) are performed. Further, a game image on which the content of the processing as described above is reflected is generated, and is displayed on the upper LCD 22.

Next, in step S94, it is determined whether or not battle mode ending conditions have been satisfied, for example, whether or not all the enemy characters have been defeated. When the ending conditions have not been satisfied (NO in step S94), the processing returns to step S71 described above, and the same processing is repeated. On the other hand, when the ending conditions have been satisfied (YES in step S94), the process concerning the battle mode ends. At this time, a process of switching to a screen of the field mode is appropriately performed.

This is the end of the detailed descriptions of the game processing according to the present embodiment.

As described above, in the present embodiment, when the player causes the player object to move at a high speed (or to make a rushing attack), such a movement is allowed by performing a slide operation on the touch panel. In this operation, the player can perform a slide operation such that the starting point is a given position. This makes it possible to improve the operability of the operation concerning the high-speed movement as described above. Further, it is also possible to perform the operation of changing the direction of the player character 101 that is moving at a high speed, using the analog stick 15. Furthermore, it is also possible to reaccelerate the player character 101 that is moving at a high speed, by further performing a slide operation as described above on the player character that is moving at a high speed. As described above, it is also possible to further control the player object that has once started to move at a high speed. This makes it possible to improve the operability.

Figure 20:
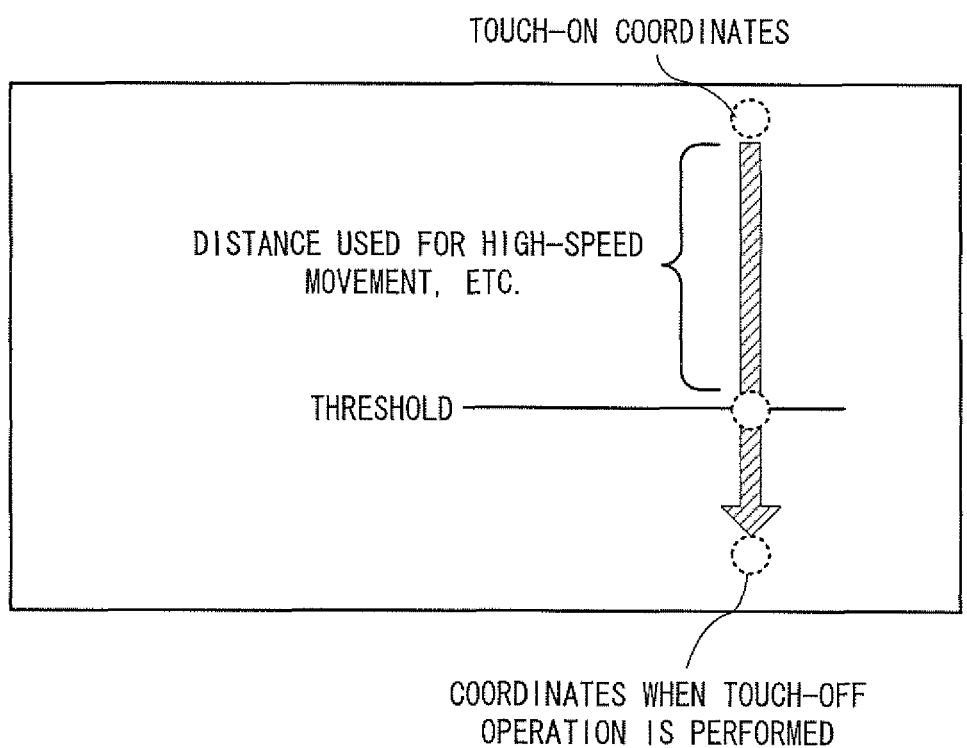
FIG. 20 is a diagram showing an example of a slide operation.

It should be noted that in the above embodiment, at the start of the high-speed movement in the field mode or at the start of the rushing attack in the battle mode, the touch coordinates detected immediately before the touch-off operation has been performed are used as the end point. The end point, however, is not limited to this. Alternatively, the end point coordinates may be those of any position between the starting point position and the position where the touch-off operation is performed. For example, as shown in FIG. 20, a predetermined distance from the starting point position may be set as a threshold, and a touch position corresponding to the threshold may serve as the end point position. In this case, the distance beyond the threshold is not reflected on the speed of the high-speed movement or the like.

In addition, in the above embodiment, the player character 101 is caused to move in the direction opposite to the direction of a slide operation. The player character 101 may be caused to move in not only the opposite direction but also any direction, so long as the direction is different from (the direction in the virtual game space corresponding to) the direction in which a slide operation has been performed.

In addition, in the above embodiment, as an example, the direction changing operation during the high-speed movement in the field mode is performed using the analog stick 15. Alternatively, the direction changing operation may be performed by another button operation, or may be performed by an operation on the touch panel 13 (e.g., a slide operation along the X-axis direction).

In addition, in the present embodiment, the descriptions are given taking as an example a hand-held game apparatus including two display devices. Alternatively, a mobile terminal may be used that includes a single display device and a touch panel provided on the screen of the display device. Further, in the present embodiment, a touch panel is taken as an example of an apparatus that detects the position indicated in the region of the operation by the player. The apparatus only needs to be a so-called pointing device that allows the player to indicate a position in a predetermined region. For example, the apparatus may also be: a mouse capable of indicating a given position on a screen; a tablet that indicates a given position on an operation surface not having a display screen; or a pointing device using a device having capturing means for remotely capturing a display screen, a marker placed in the vicinity of the display screen, or the like, to calculate, on the basis of the positions of the display screen and the marker in a captured image obtained by pointing in the direction of the display screen with the device, coordinates on the display screen corresponding to the positions pointed at on the display screen.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored thereon an input processing program, which when executed by a computer of an input processing apparatus having a pointing device for indicating position on a screen, causes the computer to perform operations comprising:
    detecting whether or not an input indicating a position on the screen has been provided by the pointing device;
    when the detecting detects that the input indicating a position on the screen has been provided, setting coordinate values corresponding to the indicated position as coordinate values of a starting point position;
    determining whether or not, after the starting point position has been set, a state where the input indicating a position on the screen is being continuously provided by the pointing device has changed to a non-indicative state where the input indicating a position on the screen is not provided by the pointing device;
    when the determining determines that the state has changed to the non-indicative state, setting coordinate values corresponding to the indicated position before the change to the non-indicative state, as coordinate values of an end point position;
    specifying a direction from the starting point position to the end point position; and
    causing a virtual object to move such that a moving direction of the virtual object is a direction different from the specified direction, wherein the virtual object is caused to move irrespective of the relation between the starting point position and a position of the virtual object on the screen at the time of the detecting.

2. The non-transitory computer-readable storage medium having stored thereon the input processing program according to claim 1, wherein the operations further comprise causing
    the virtual object to move when the starting point position and the end point position are different from each other in coordinate values.

3. The non-transitory computer-readable storage medium having stored thereon the input processing program according to claim 1, the operations further comprise:
    receiving a predetermined input after the caused movement of the virtual object has started, and in response to the predetermined input, changing the moving direction of the virtual object in accordance with a content of the predetermined input.

4. The non-transitory computer-readable storage medium having stored thereon the input processing program according to claim 1, the operations further comprising:
    switching an input mode between a first input mode and a second input mode, wherein
    (a) when the input mode is the first input mode, a direction on the basis of coordinate values of one predetermined axis defined in advance is specified as the direction from the starting point position to the end point position; and
    (b) when the input mode is the second input mode, a direction on the basis of coordinate values of at least two axes is specified as the direction from the starting point position to the end point position.

5. The non-transitory computer-readable storage medium having stored thereon the input processing program according to claim 4, the operations further comprising:
    receiving a predetermined input after the caused movement of the virtual object has started, wherein
    if the predetermined input is received when the input mode is the first input mode, changing the moving direction of the virtual object in accordance with a content of the predetermined input.

6. The non-transitory computer-readable storage medium having stored thereon the input processing program according to claim 5, wherein the operations further comprise
    if the content of the input received when the input mode is the first input mode indicates a direction of an axis different from the one predetermined axis defined in advance, changing the moving direction of the virtual object to the indicated direction of the axis.

7. The non-transitory computer-readable storage medium having stored thereon the input processing program according to claim 3, the operations further comprising receiving, after the caused movement of the virtual object has started, the an input from an input device other than the pointing device.

8. The non-transitory computer-readable storage medium having stored thereon the input processing program according to claim 1, the operations further comprising:
receiving a predetermined input after the caused movement of the virtual object has started, and in response to the predetermined input, stopping the movement of the virtual object in accordance with the predetermined input.

9. The non-transitory computer-readable storage medium having stored thereon the input processing program according to claim 8, the operations further comprise:
determining whether or not the same values have been output from the pointing device continuously for a predetermined time or longer as the coordinate values indicating the position on the screen, and
when it is determined that the same values have been output continuously for the predetermined time or longer, stopping the movement of the virtual object.

10. The non-transitory computer-readable storage medium having stored thereon the input processing program according to claim 1, the operations further comprise:
specifying the direction from the starting point position to the end point position on the basis of coordinate values of at least one axis; and
setting, as the moving direction of the virtual object, a direction in a virtual space corresponding to a direction opposite to the specified direction.

11. The non-transitory computer-readable storage medium having stored thereon the input processing program according to claim 1, the operations further comprise:
setting a moving speed or an acceleration of the virtual object in accordance with a distance between the starting point position and the end point position; and
causing the virtual object to move on the basis of the set moving speed or the set acceleration.

12. The non-transitory computer-readable storage medium having stored thereon the input processing program according to claim 1, wherein
the input processing apparatus includes a first screen and a second screen,
the pointing device is used to indicate a position on the second screen, and
the virtual object is displayed on the first screen.

13. The non-transitory computer-readable storage medium having stored thereon the input processing program according to claim 1, wherein
the pointing device is a touch panel.

14. An input processing apparatus including
a processing system including at least one processor, the processing system configured to perform operations comprising:
detecting whether or not an input indicating a position on a screen has been provided by a pointing device;
when the detecting detects that the input indicating a position on the screen has been provided, setting coordinate values corresponding to the indicated position as coordinate values of a starting point position;
determining whether or not, after the starting point position has been set, a state where the input indicating a position on the screen is being continuously provided by the pointing device has changed to a non-indicative state where the input indicating a position on the screen is not provided by the pointing device;
when the determining determines that the state has changed to the non-indicative state, setting the coordinate values corresponding to the indicated position before the change to the non-indicative state, as coordinate values of an end point position;
specifying a direction from the starting point position to the end point position; and
causing a virtual object to move such that a moving direction of the virtual object is a direction different from the specified direction, wherein the virtual object is caused to move irrespective of the relation between the starting point position and the virtual object on the screen at the time of the detecting.

15. An input processing method performed by an input processing apparatus having a pointing device for indicating a position on a screen, the input processing method comprising:
detecting whether or not an input indicating the position on the screen has been provided by the pointing device;
when it is detected that the input indicating a position on the screen has been provided, setting coordinate values corresponding to the indicated position as coordinate values of a starting point position;
determining whether or not, after the starting point position has been set, a state where the input indicating a position on the screen is being continuously provided by the pointing device has changed to a non-indicative state where the input indicating a position on the screen is not provided by the pointing device;
when it is determined that the state has changed to the non-indicative state, setting coordinate values corresponding to the indicated position before the change to the non-indicative state, as coordinate values of an end point position;
specifying a direction from the starting point position to the end point position; and
causing a virtual object to move such that a moving direction of the virtual object is a direction different from the specified direction, wherein the virtual object is caused to move irrespective of the relation between the starting point position and the virtual object on the screen at the time of the detecting.

16. An input processing system comprising:
a screen;
a pointing device for indicating a position on the screen; and
at least one processor configured to perform operations comprising:
detecting whether or not an input indicating the position on the screen has been provided by the pointing device;
when the detecting detects that the input indicating a position on the screen has been provided, setting coordinate values corresponding to the indicated position as coordinate values of a starting point position;
determining whether or not, after the starting point position has been set, a state where the input indicating a position on the screen is being continuously provided by the pointing device has changed to a non-indicative state where the input indicating a position on the screen is not provided by the pointing device;
when the determining determines that the state has changed to the non-indicative state, setting coordinate values corresponding to the indicated position before the change to the non-indicative state, as coordinate values of an end point position;

specifying a direction from the starting point position to the end point position; and causing a virtual object to move such that a moving direction of the virtual object is a direction different from the specified direction, wherein the virtual object is caused to move irrespective of the relation between the starting point position and the virtual object on the screen at the time of the detecting.

\* \* \* \* \*